United States Patent
Cunningham

(10) Patent No.: US 9,760,123 B2
(45) Date of Patent: Sep. 12, 2017

(54) SPEECH GENERATION DEVICE WITH A PROJECTED DISPLAY AND OPTICAL INPUTS

(75) Inventor: Bob Cunningham, Pittsburgh, PA (US)

(73) Assignee: Dynavox Systems LLC, Pittsburgh, PA (US)

( * ) Notice: Subject to any disclaimer, the term of this patent is extended or adjusted under 35 U.S.C. 154(b) by 909 days.

(21) Appl. No.: 13/197,180

(22) Filed: Aug. 3, 2011

(65) Prior Publication Data

US 2012/0035934 A1 Feb. 9, 2012

Related U.S. Application Data

(60) Provisional application No. 61/371,342, filed on Aug. 6, 2010.

(51) Int. Cl.
| | |
|---|---|
| G09B 21/00 | (2006.01) |
| G06F 1/16 | (2006.01) |
| G06F 3/01 | (2006.01) |
| G06F 3/16 | (2006.01) |
| G10L 13/00 | (2006.01) |

(52) U.S. Cl.
CPC .......... *G06F 1/1639* (2013.01); *G06F 1/1673* (2013.01); *G06F 1/1686* (2013.01); *G06F 3/013* (2013.01); *G06F 3/017* (2013.01); *G06F 3/165* (2013.01); *G10L 13/00* (2013.01)

(58) Field of Classification Search
CPC .............................. G06F 1/1639; G09B 21/00
USPC .......................................................... 434/116
See application file for complete search history.

(56) References Cited

U.S. PATENT DOCUMENTS

| | | | |
|---|---|---|---|
| 3,712,716 A | | 1/1973 | Cornsweet et al. |
| 4,950,069 A | | 8/1990 | Hutchinson |
| 5,402,542 A | | 4/1995 | Viard |
| 5,534,917 A | | 7/1996 | MacDougall |
| 5,689,619 A | | 11/1997 | Smyth |
| 5,767,842 A | * | 6/1998 | Korth ............................ 345/168 |
| 5,818,954 A | | 10/1998 | Tomono et al. |
| 5,861,940 A | | 1/1999 | Robinson et al. |
| 6,005,549 A | * | 12/1999 | Forest .................... G06F 3/011 |
| | | | 345/157 |
| 6,079,829 A | | 6/2000 | Bullwinkel |

(Continued)

FOREIGN PATENT DOCUMENTS

| | | |
|---|---|---|
| WO | WO 02/064031 | 8/2002 |
| WO | WO 2008/146098 | 12/2008 |

(Continued)

*Primary Examiner* — Thomas Hong
(74) *Attorney, Agent, or Firm* — Dority & Manning, P.A.

(57) ABSTRACT

In several embodiments, a speech generation device is disclosed. The speech generation device may generally include a projector configured to project images in the form of a projected display onto a projection Surface, an optical input device configured to detect an input directed towards the projected display and a speaker configured to generate an audio output. In addition, the speech generation device may include a processing unit communicatively coupled to the projector, the optical input device and the speaker. The processing unit may include a processor and related computer readable medium configured to store instructions executable by the processor, wherein the instructions stored on the computer readable medium configure the speech generation device to generate text-to-speech output.

10 Claims, 7 Drawing Sheets

(56) References Cited

U.S. PATENT DOCUMENTS

| | | | |
|---|---|---|---|
| 6,141,034 A * | 10/2000 | McCutchen | G02B 27/22 348/36 |
| 6,152,563 A | 11/2000 | Hutchinson et al. | |
| 6,323,942 B1 | 11/2001 | Bamji | |
| 6,611,253 B1 * | 8/2003 | Cohen | 345/168 |
| 6,650,318 B1 * | 11/2003 | Arnon | 345/168 |
| 6,943,754 B2 * | 9/2005 | Aughey et al. | 345/8 |
| 7,042,442 B1 * | 5/2006 | Kanevsky | G06F 3/0426 345/157 |
| 7,058,204 B2 | 6/2006 | Hildreth et al. | |
| 7,144,116 B2 | 12/2006 | Huang | |
| 7,227,526 B2 | 6/2007 | Hildreth et al. | |
| 7,561,143 B1 * | 7/2009 | Milekic | 345/156 |
| 7,572,008 B2 | 8/2009 | Elvesjo et al. | |
| 7,626,569 B2 * | 12/2009 | Lanier | 345/156 |
| 8,487,838 B2 * | 7/2013 | Lewis et al. | 345/8 |
| 2003/0123027 A1 * | 7/2003 | Amir | G06K 9/00604 351/209 |
| 2003/0132950 A1 * | 7/2003 | Surucu et al. | 345/700 |
| 2004/0108990 A1 * | 6/2004 | Lieberman et al. | 345/156 |
| 2004/0174496 A1 * | 9/2004 | Ji | G06F 3/013 351/209 |
| 2005/0100191 A1 * | 5/2005 | Harbach et al. | 382/103 |
| 2007/0014431 A1 * | 1/2007 | Hammoud et al. | 382/103 |
| 2007/0164990 A1 | 7/2007 | Bjorklund et al. | |
| 2007/0222760 A1 | 9/2007 | Lieberman et al. | |
| 2007/0291231 A1 * | 12/2007 | Hammoud et al. | 351/222 |
| 2008/0013913 A1 | 1/2008 | Lieberman et al. | |
| 2008/0047762 A1 | 2/2008 | Lieberman et al. | |
| 2008/0068353 A1 | 3/2008 | Lieberman et al. | |
| 2008/0093542 A1 | 4/2008 | Lieberman et al. | |
| 2008/0284980 A1 | 11/2008 | Skogo et al. | |
| 2009/0122028 A1 | 5/2009 | Ing | |
| 2009/0200453 A1 | 8/2009 | Lieberman et al. | |

FOREIGN PATENT DOCUMENTS

| | | |
|---|---|---|
| WO | WO 2010/073024 | 7/2010 |
| WO | WO 2010/073045 | 7/2010 |
| WO | WO 2010/141403 | 12/2010 |
| WO | WO 2011/044429 | 4/2011 |

* cited by examiner

SPEECH GENERATION DEVICE WITH A PROJECTED DISPLAY AND OPTICAL INPUTS

CROSS-REFERENCE TO RELATED APPLICATIONS

This application claims the benefit of previously filed U.S. Provisional Patent Application entitled "SPEECH GENERATION DEVICE WITH A PROJECTED DISPLAY AND OPTICAL OUTPUTS," assigned U.S. Ser. No. 61/371,342, filed Aug. 6, 2010, and which is fully incorporated herein by reference for all purposes.

BACKGROUND OF THE INVENTION

The present invention generally pertains to speech generation devices and, more particularly, to speech generation devices having a projected display with an optical input.

Various debilitating physical conditions, whether resulting from disease or injuries, can deprive the afflicted person of the ability to communicate audibly with persons or devices in one's environment in real time. For example, many individuals may experience speech and learning challenges as a result of pre-existing or developed conditions such as autism, ALS, cerebral palsy, stroke, brain injury and others. In addition, accidents or injuries suffered during armed combat, whether by domestic police officers or by soldiers engaged in battle zones in foreign theaters, are swelling the population of potential users. Persons lacking the ability to communicate audibly can compensate for this deficiency by the use of speech generation devices.

Speech generation devices (SGDs), some embodiments of which may be known as Alternative and Augmentative Communications (AAC) devices, can include a variety of features to assist with a user's communication. In general, a speech generation device may include an electronic interface with specialized software configured to permit the creation and manipulation of digital messages that can be translated into audio speech output. Additional communication-related features also may be provided depending on user preferences and abilities. Users may provide input to a speech generation device by physical selection using a touch screen, mouse, joystick, physical input switches or the like or by other means such as eye tracking or head tracking.

It is estimated that less than ten percent (10%) of the potential users of speech generation devices currently is being served by conventional speech generation devices. This population is highly variable from the standpoint of a range in ages from preschool children through elderly adults and a variety of lifestyles, geographic locations, educational attainments, language sophistication, and available physical motor skills to operate the speech generation device. As such, a need exists for further refinements and improvements to speech generation devices that continuously adapt such devices for a greater number and variety of users.

Conventional speech generation devices are generally used across a wide range of applications and settings. For example, some speech generation devices are used as desktop devices, while others are rendered portable by being mounted on vehicles such as wheelchairs or by being configured as handheld devices. To accommodate such varied uses, the multitude of hardware and software features of an SGD are typically built into a single integrated assembly. Thus, the onboard computers and other processing equipment are often disposed in a single housing together with a display device and a plethora of other peripheral devices such as microphones, speakers and the like.

As an integrated assembly, the size of an SGD is generally dictated by the size of the display device mounted within the housing or casing of the SGD. Thus, since display devices for conventional SGDs are typically rather large in order to provide sufficient display area for the various communication screens that must be displayed to the user, the size of a conventional SGD is often quite substantial. As such, many conventional speech generation devices can have particular drawbacks for a user. For example, an SGD must generally be disposed in a location that provides a user visual access to the display of the SGD. Thus, for a user who must communicate utilizing an SGD mounted to his wheelchair, bulky conventional devices may potentially block the user's view to other objects in his environment and also may obscure the user from others. This restriction of a user's visual vantage can sometimes be awkward for a user, particularly when the user's mobility within the wheelchair is limited (e.g., the ability of the user to adjust his seating position). Moreover, conventional integrated units are often relatively heavy due to the large display devices and various other hardware components incorporated therein. Thus, these devices may be very burdensome and awkward to carry, move or otherwise transport. Such devices also are more likely to cause damage to the SGD if the device is dropped. Accordingly, a need exists to reduce the size, weight and overall portability of an SGD.

Additionally, current speech generation devices typically consume large amounts of power. In particular, the display devices associated with many conventional SGDs have substantial power requirements which require the SGD be located near an electrical outlet and, thus, limit freedom of movement of the user. Other conventional speech generation devices seek to overcome this problem with the provision of a battery, but still must be recharged at periodic intervals. Substantial power requirements also can be related to issues of size, weight and excessive heat generation in a device. Because of these many concerns, a further need exists to generally reduce the power requirements, size and weight of various SGD components, including the display units.

Further, speech generation devices are often designed with a particular type of user in mind and, thus, lack the ability to be used by varying persons having a wide range of physical disabilities. For example, conventional SGDs may require a user to provide some sort of physical input, such as contacting a touch screen or actuating a physical switch, to enable the user to make selections relating to desired functions to be performed by the SGD. Such devices, however, may exclude use by persons that have limited motor control or by persons expected to have diminishing motor control with the passage of time. Moreover, since conventional display devices for an SGD typically consist of a display panel mounted within a housing or casing, conventional SGDs lack the capability to accommodate varying display sizes. Thus, for a user who has difficulty viewing the images displayed on a typical display device, the only solution is to zoom-in or magnify the displayed images, which often makes navigating through the communications screens of an SGD quite difficult. Accordingly, a need exists for an SGD that may be used by persons having a variety of physical disabilities.

In light of the design concerns in the field of speech generation devices, a need continues to exist for refinements and improvements to address such concerns. While various implementations of speech generation devices and associated features have been developed, no design has emerged that is known to generally encompass all of the desired characteristics hereafter presented in accordance with aspects of the subject technology.

BRIEF SUMMARY OF THE INVENTION

In general, the present subject matter is directed to various exemplary speech generation devices (SGDs) that include projected displays.

For example, exemplary speech generation devices in accordance with aspects of the presently disclosed technology generally may include a projector serving as a display output feature for the SGD. For example, the projector may be configured to project SGD content, such as graphical user interfaces and the like, in the form of a projected display onto any suitable projection surface. In particular embodiments of the present subject matter, the projector may comprise a pico projector or other relatively compact projector. The SGD also may include a central processing unit configured to provide processing functionality to the projector and the various other components of the SGD. In particular, the central processing unit may be communicatively coupled to the projector, such as through a wired or wireless connection, such that images generated by the central processing unit may be transmitted to the projector and subsequently projected as a projected display onto any suitable surface.

The speech generation device of the present subject matter further includes one or more optical input devices for capturing user inputs. For example, in one embodiment, the optical input device(s) may comprise a camera(s), optical sensor(s) or other optical device(s) capable of detecting the location of a user's finger or other pointing device in reference to the projected display. Accordingly, a user may provide selection inputs to the SGD by simply pointing at and/or touching the location on the projected display at which a desired button, menu, or other graphical user interface element to be selected is located. Additionally, in a particular embodiment of the present subject matter, the optical input device(s) may be configured to capture images of the user's hands. As such, the SGD may be capable of utilizing hand gesture recognition as a source of user inputs.

Generally, the central processing unit and any associated input/output devices may enable the SGD to transmit and receive messages to assist a user in communicating with others. For example, the SGD may correspond to a particular special-purpose electronic device that permits a user to communicate with others by producing digitized or synthesized speech based on configured messages. Such messages may be preconfigured and/or selected and/or composed by a user within a message window displayed on the display device. Additionally, the variety of input devices and software interface features of the SGD may be provided to facilitate the capture of user input to define what information should be displayed in a message window and ultimately communicated to others as spoken output or other outgoing communication.

In general, the disclosed SGD may provide numerous advantages for a user of a speech generation device. For example, because the SGD does not include a bulky display device, the SGD may be designed to be relatively compact and lightweight. As such, the disclosed SGD is rendered very portable. A lightweight device also may reduce the likelihood of damage occurring to any components of the SGD in the event that they are dropped. Moreover, the SGD of the present subject matter may be configured to project SOD content onto any surface, which may significantly enhance the options provide to a user for displaying SGD content and otherwise interacting with the SGD. In particular, SGD content may be projected onto a desk, table, wall, board, projection screen or on any other suitable surface. Such flexibility in display options may generally provide a user with the instant availability of communication regardless of the setting in which the user is located. For example, a user confined to a wheelchair may choose to project SGD content onto an adjacent wall, on a projection screen mounted to the wheelchair and disposed in front of the user, on a lay tray resting on the user's lap or onto an adjacent table or desk. Additionally, a large projected display may be provided by the disclosed projector without the necessity of requiring a bulky conventional display device. As such, the SGD may be equipped to meet the demands of a particular user without increasing the power consumption and size of the device, providing even further flexibility for use of the SGD.

In several embodiments of the present subject matter, additional advantages may be provided through the use of an optical input device configured to capture user inputs directed towards the projected display. In particular, the optical input device may enable a user to make input selections by simply pointing at the projected images displayed by the projector, thereby eliminating the need to apply pressure or otherwise touch the projected images in order to make an input selection. As such, the disclosed SGD may provide particular advantages for a user who may have motor control limitations. Moreover, in another embodiment, the optical input device also may be utilized for hand gesture recognition, thereby providing additional input options for a user.

Additional aspects and advantages of the invention will be set forth in part in the description that follows, and in part will be obvious from the description, or may be learned by practice of the invention. The various aspects and advantages of the invention may be realized and attained by means of the instrumentalities and combinations particularly described below.

BRIEF DESCRIPTION OF THE DRAWINGS

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

DETAILED DESCRIPTION OF THE PREFERRED EMBODIMENTS

Reference now will be made in detail to the presently preferred embodiments of the invention, one or more examples of which are illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

Figure 1:
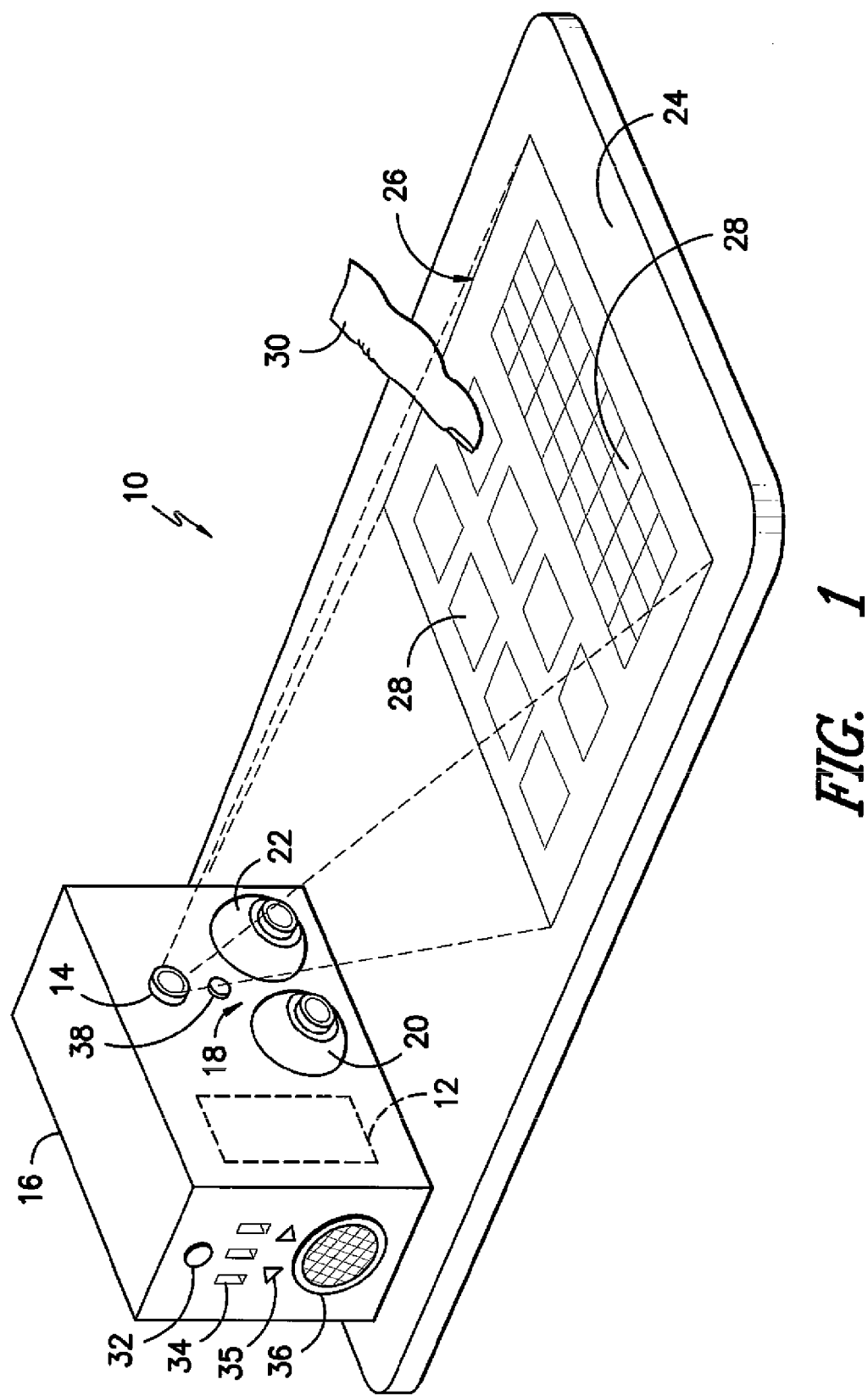
FIG. 1 illustrates a perspective view, with items normally hidden from view being indicated by dashed lines, of one exemplary embodiment of a speech generation device in accordance with aspects of the present subject matter.

Referring now to the drawings, FIG. 1 illustrates one exemplary embodiment of a speech generation device (SGD) 10 in accordance with aspects of the present subject matter. The SGD 10 generally includes a central processing unit 12 configured to provide processing functionality to the various components of the SGD 10, which will be described in greater detail with reference to FIG. 4. The rectangular dashed outlined schematically indicates disposition of the central processing unit 12 within the housing 16. In general, the central processing unit 12 may be configured to access one or more computer-readable media embodying computer-readable instructions which, when executed by the processing unit 12, cause the central processing unit 12 to provide the desired functionality disclosed herein. The SGD 10 also may include a projector 14 and one or more optical input devices 18 communicatively coupled to the central processing unit 12. As shown, the central processing unit 12, projector 14, optical input device(s) 18 and other components of the SGD (e.g., speakers 36) may be formed as an integrated assembly and may be attached to and/or disposed within the housing 16. However, it should be appreciated that, in alternative embodiments, the central processing unit 12 and/or other components of the SGD 10 may be disposed in and/or on separate housings and/or one or more of the component(s) may be configured as a separate, peripheral component.

In general, the projector 14 and associated optical input device(s) 18 of the SGD 10 may be configured to provide a "touch" and/or "point" sensitive projected display 26. In particular, the projector 14 generally may serve as an output feature for the SGD 10 and may be configured to project SGD content (e.g., communication screens, menus and other graphical user interfaces and their corresponding elements 28), in the form of a projected display 26, onto any suitable projection surface 24. The optical input device(s) 18 generally may serve as input feature for the SGD 10 and may be configured to determine the location of an input object 30 (e.g., a user's finger, a stylus or other pointing device) relative to the projected display 26. For example, the optical input device(s) may be configured to capture images of the input object 30 and/or detect light reflected by the input object 30 and/or sense heat generated by the input object 30 as the object is pointing at and/or touching a specific location on the projected display 26. The optical data captured by the optical input devices may then be transmitted to the central processing unit 12 to enable the projected display 26 to function as a point/touch sensitive display. In particular, the central processing unit 12 may be provided with suitable computer-readable instructions (e.g., various types of finger/feature/object tracking software, three-dimensional mapping software and/or other gesture recognition software) that, when implemented, permit the processing unit 12 to determine the precise location at which the input object 30 is located relative to the projected display 26. As such, appropriate control signals may be triggered such that the central processing unit 12 may perform an appropriate action in response to the user pointing at and/or touching portions of the projected display 26.

Generally, the images displayed by the projector 14 correspond to graphical user interfaces and other SGD content that depict "buttons," other user-selectable interface elements 28 and/or other input features that may be selectable by the user. Thus, as indicated above, these buttons and/or interface elements 28 may comprise user input features that, when selected by the user, trigger control signals to be sent to the central processing unit 12 so that an action may be performed in accordance with the user's selection. Accordingly, the point/touch sensitive projected display 26 may permit such buttons to be quickly and efficiently selected by the user. For example, in one embodiment, if a user is pointing his finger in the direction of a particular graphical interface element 28, a cursor (e.g., a mouse pointer) position may be generated by the central processing unit 12 and displayed by the projector 14, with such cursor position corresponding to the location at which the user is pointing. In the event that the user points his finger at the interface element 28 for a predetermined period of time, thereby causing the cursor to dwell on such element 28 for an extended period of time, this may indicate to the central processing unit 12 a selection of that particular interface element 28. As such, the central processing unit 12 may execute appropriate actions associated with the user's selection, such as generating a text-to-speech output, opening a new window, highlighting a key on a displayed keyboard and the like.

Of course, it should be appreciated that various other user actions may be recognized as input selections in addition to, or as an alternative to, the above described dwell methodology. For example, input selections may be executed by physically touching or contacting the projection surface 24 with the input object 30 or by the user executing a tapping motion with the input object 30 (e.g., when the user quickly moves the input object up and down). Of course, other user actions also may correspond to user inputs. For instance, if the user swipes or sweeps his finger across the projected display 26, this may indicate a scrolling input and the SGD content displayed on the projected display 26 may be scrolled up/down and/or left/right in response to such motion. Additionally, when the SGD 10 of the present subject mater is configured to detect the location of more than one input object 30 (e.g., two or more of the user's fingers), the central processing unit 12 may be capable of recognizing even further gestures and/or movements as user inputs. For instance, if a user moves two of his fingers away from or towards each other, this may indicate a pinch zooming input and the image displayed on the projected display 26 may be zoomed in/out accordingly.

It should be also appreciated that the various buttons and other graphical user interface elements 28 provided on the projected display 26 may correspond to a plurality of different SGD functions. For example, the buttons may comprise words, phrases or other information that may be customized based on user preferences and/or their frequency of use. Thus, when such a button is selected by the user, the SGD 10 may be configured to automatically speak the words and/or phrases associated with the button. Alternatively, selection of the button may cause the words and/or phrases to be displayed within a message window of the projected display 26. Other buttons may correspond to a conventional "QWERTY" keyboard that permits a user to manually type words or phrases that may be generated as a text-to-speech output by the SGD 10 or may be stored within an internal database of the SGD 10. Alternatively, the keyboard buttons may permit a user to compose an email or text message. It should also be appreciated that the images displayed by the projector 14 may correspond to various other SGD content that may be available to the user of a speech generation device. For instance, when the SGD 10 of the present subject matter a wireless network adaptor for providing access to a network (e.g., the internet), the projected images may includes web browser pages or other web-based content.

Still referring to FIG. 1, the projector 14 of the present subject matter generally may comprise any suitable projector and/or projection device known in the art for providing a dynamic image (e.g., an image that may be updated, such as scrolled, panned, zoomed, etc, in response to inputs provided to the SGD 10). In other words, the projector 14 generally may be configured to convert electronic signals, received from the central processing unit 12 and corresponding to graphical user interfaces or other SGD content, into images that may be displayed to the user as a projected display 26. Thus, it should be appreciated that the projector 14 may include suitable processing features and hardware components to enable the projector 14 to process, manipulate and/or transform signals transmitted from the central processing unit 12 into projectable images that may be projected onto any suitable surface 24 as a projected display 26. For example, in one embodiment, the projector 14 may include a spatial light modulator (SLM) illuminated by at least one light source and suitable output optics (e.g., projection lenses) configured to project modulated light from the SLM onto any desired projection surface 24. As is generally known, the SLM may be configured to reflect or transmit light received from the light source in accordance with the electronic signals received from the central processing unit 12. Additionally, the light source generally may comprise any suitable light source, such as a coherent light source (e.g., a laser), a light emitting diode (LED), a filament lamp and/or fluorescent lamp. Additional optical elements such as, but not limited to, lenses, filters and the like also may be selectively incorporated into various projector embodiments.

Moreover, in several exemplary embodiments of the present subject matter, the projector 14 may be configured as a pico projector. As such, the projector 14 may be designed as a relatively compact device. In general, it should be appreciated that various pica projectors are known in the art. For instance, many SLM-based pico projectors may be configured as digital light processing (DLP) projectors or liquid crystal on silicon-based (LCOS) projectors, which utilize a two-dimensional array of pixel mirrors to modulate light from a light source (e.g., a laser) in order to project images onto any desired surface.

In a typical DLP projector, a light source is optically coupled to an array of microscopic mirrors through one or more optical lenses and, optionally, one or more color filters/wheels. The micro-mirrors are generally disposed on an optical semiconductor chip communicatively coupled to the source of the image to be projected (e.g., the central processing unit 12). In order to produce the desired image, the source image is deconstructed into electronic signals, which are transmitted to the semiconductor chip. In general, the semiconductor chip may be configured to tilt each micro-mirror toward the light source (and into an "on" position) or away from the light source (and into an "off" position). Thus, by rapidly switching the mirrors between the on and off positions (e.g., up to several thousand times per second) and modulating the amount of time that the mirrors are on, the semiconductor chip can control the amount of light reflected off of each mirror and, therefore, may convert the electronic signals, representing the deconstructed image, into a projectable image. The image reflecting off of the mirrors is then passed through a projection lens such that the image may be projected onto any surface. It should be appreciated that suitable DLP projectors for use with the speech generation device of the present subject matter are available from Texas Instruments of Dallas, Tex. and are described in U.S. Pat. No. 7,144,116, which is incorporated by reference herein in its entirety for all purposes.

Unlike a DLP projector, a typical LCOS projector utilizes a plurality of LCOS "mirrors" that are not movable. In particular, a LCOS projector uses a LCOS microdisplay formed from a liquid crystal (LC) material disposed between both a cover glass having an optically transparent electrical coating (e.g., an indium tin oxide coating) and a complementary metal-oxide semiconductor (CMOS) integrated circuit. Individual pixels are formed by a top metal layer of the integrated circuit and act as both reflective mirrors and electrodes to control the LC material disposed above the mirrors/electrodes. The CMOS substrate also supports the integration of transistors under each of the mirrors/electrodes, as well as memory and processing functions to control each pixel. Instead of moving the mirrors/electrodes to control the amount of light reflected, the mirrors/electrodes are configured to apply a small electric field which causes the LC material to change the polarization of light originating from a light source (e.g., a coherent light source). As such, when coupled with polarizing optics, the LC material can be used to control the light intensity of each pixel, thereby permitting the creation of an image which may be projected onto any surface using one or more suitable projection lenses. It should be appreciated that LCOS projectors and LCOS microdisplays suitable for use as or with the projector 14 of the present subject matter are commercially available from Aurora of San Jose, Calif., Syndiant of Dallas, Tex., Micron Technology of Boise, Id., Forth Dimension Displays of Dalgety Bay, Scotland, Boulder Nonlinear Systems of Lafayette, Colo., Holoeye of Germany having offices in Carlsbad, Calif.

It should also be appreciated that various other suitable pico projector configurations also may be utilized within the scope of the present subject matter. For example, pico projectors may be configured as laser-beam-steering (LBS) projectors, which utilize one or a pair of bidirectional mirrors (e.g., a microelectromechanical-system (MEMS) scanning mirror) to sweep a pixel-wide laser beam across a surface in order to create an image one pixel at a time. Pico projectors also may be configured as holographic laser projection (HLP) projectors, which utilize a hologram or diffraction pattern, displayed on a LCOS microdisplay, to diffract a coherent light beam to create a projectable image. Suitable LBS projectors for use with the SGD 10 of the present subject matter are commercially available from Microvision of Redmond, Wash. and are described in U.S. Pat. Pub. Nos. 2008/0037090 (Miller) and 2009/0128782 (Miller), which are hereby incorporated by reference herein in their entirety for all purposes. Moreover, suitable HLP projectors for use with the disclosed SGD are commercially available from Light Blue Optics of Cambridge, United Kingdom and are described in U.S. Pat. Pub. No. 2010/0142016 (Cable), which is hereby incorporated by reference herein in its entirety for all purposes.

Figure 3:
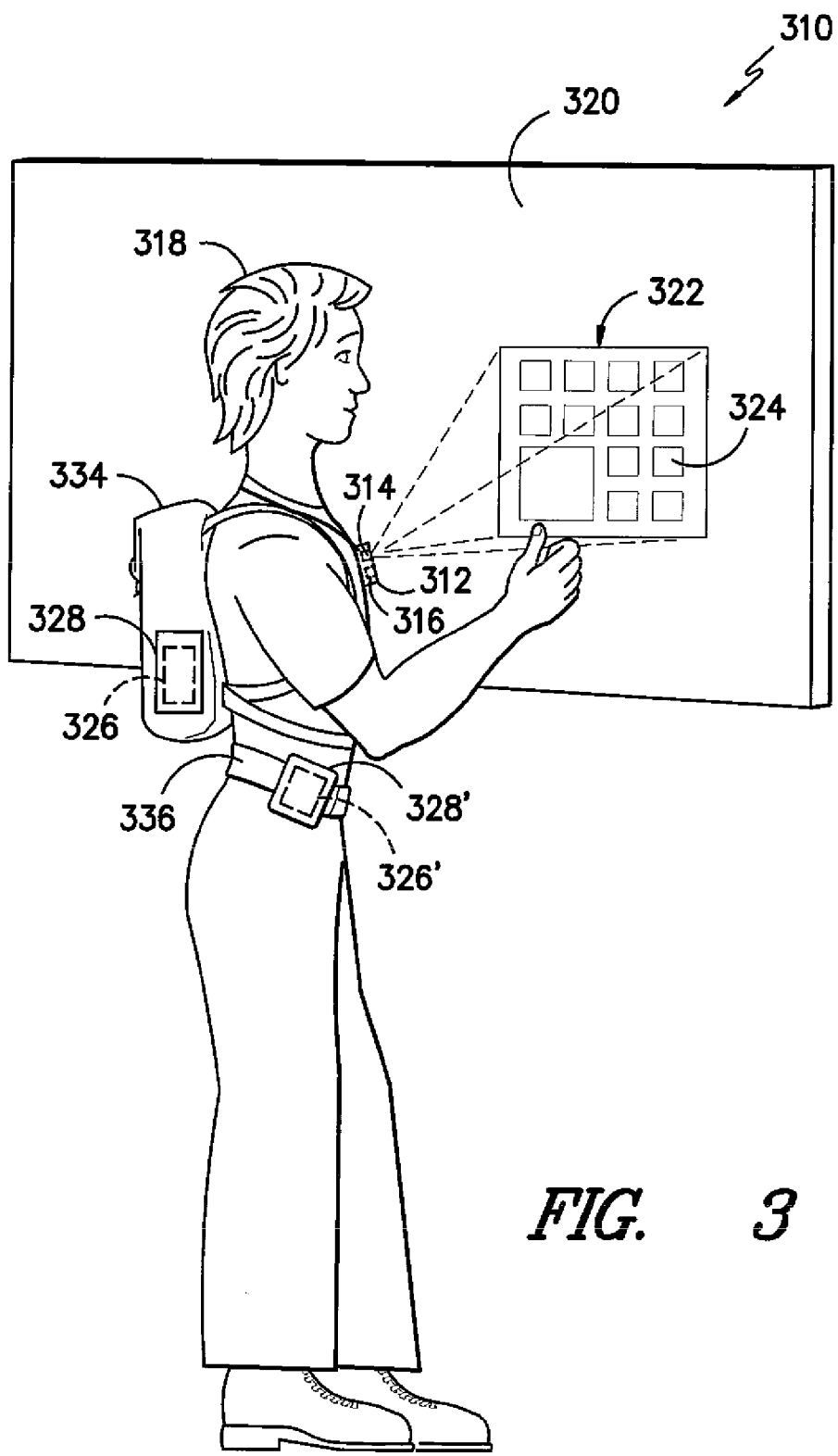
FIG. 3 illustrates a perspective view, with items normally hidden from view being indicated by dashed lines, of a further exemplary embodiment of a speech generation device in accordance with aspects of the present subject matter.

Generally, the projector 14 may be configured to project images onto any suitable projection surface 24. For example, as shown in FIG. 1, the projector 14 may be configured to project images onto the flat surface 24 on which the SGD 10 is placed, such as on a table, desk or the like. Alternatively, the projector 14 may be adapted to project images onto various other surfaces within a user's environment. For instance, as shown in FIG. 3, the projector 314 may project images onto an adjacently disposed vertical surface 320, such as a wall, a projector screen or a board. As another example, referring to FIG. 5, the projector 514 may be disposed within and/or attached to a housing 512 mounted to a user's wheelchair 516 such that the projector 514 can project images onto a lap tray 520 or, in some cases, an adjacent wall or a projection screen disposed in front of the user. In another embodiment, shown in FIG. 6, the projector 614 may be configured to project enlarged images corresponding to SGD content onto a wall or other suitable vertical surface 622 such that the projected images may be viewed by the user 618 from a distance.

It should be appreciated that projector 14 also may be adapted to project images onto a curved projection surface. In such an embodiment, known calculations and methodologies (e.g., reverse and/or forward mapping) may be executed to account for any distortion in the images that may occur due to the curvature of the surface. Examples of such methods are described in International Pub. Nos. WO 2010/073045 (Lawrence) and WO 2010/073024 (Lawrence), which are hereby incorporated by reference herein in their entirety for all purposes. Further, it should also be appreciated that, in one embodiment, the projector 14 may be configured to directly project images from the projection lenses or other output optics directly onto the projection surface 24. Alternatively, images may be indirectly projected onto the projection surface 24. For example, as is generally understood by those of ordinary skill in the art, the projector 14 may be configured such that images projected from the projection lenses are first directed onto a mirror disposed at a location further from the projection surface 24 than the projector 14, itself, such that the resulting projected display 26 is enlarged.

Figure 6:
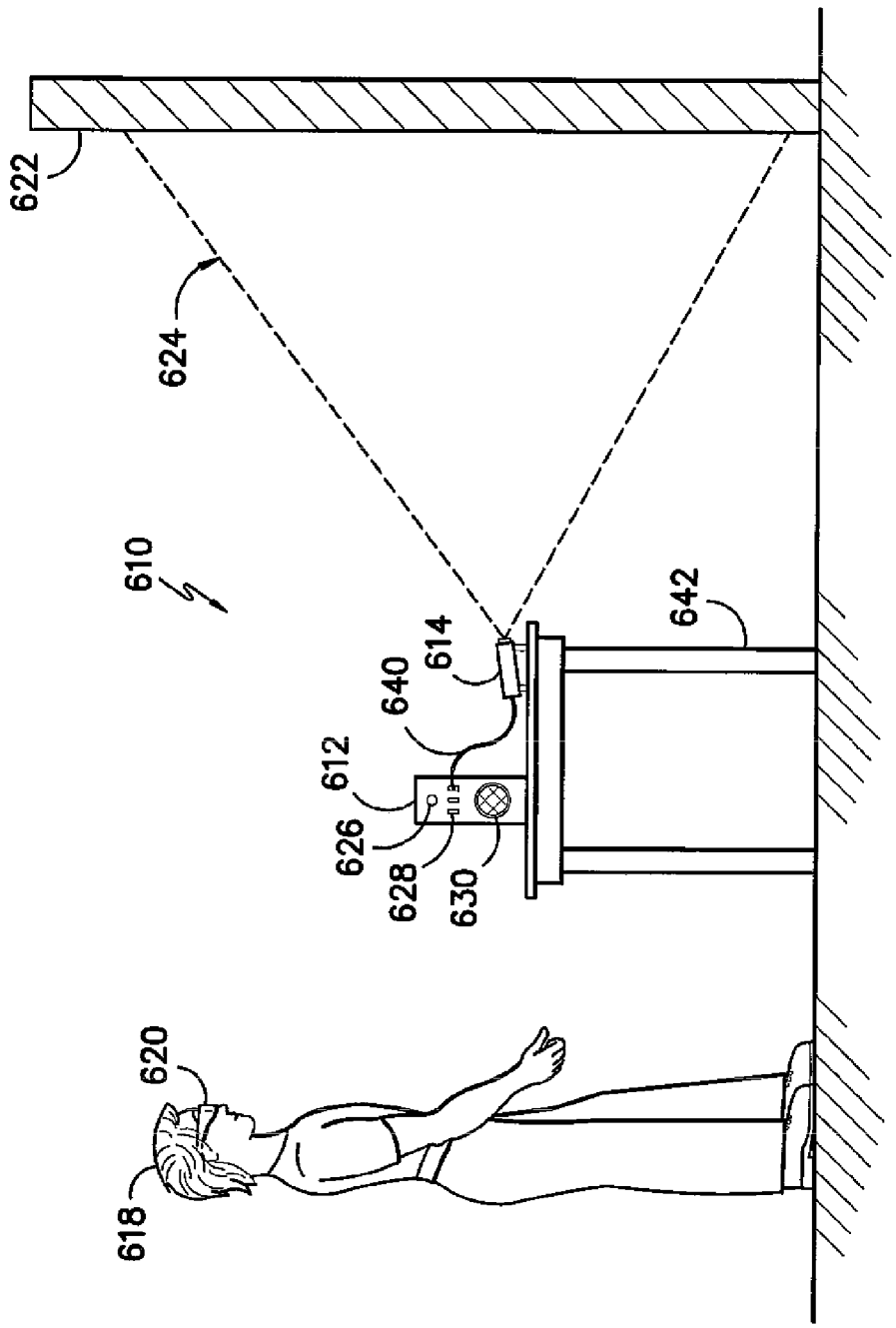
FIG. 6 illustrates a perspective view of a still further exemplary embodiment of a speech generation device in accordance with aspects of the present subject matter.

To accommodate such varied applications, it should be appreciated that, as shown in FIG. 6, the projector 614 may be configured as a separate, peripheral device and may be communicatively coupled to the central processing unit via a wired or wireless connection. Alternatively, in embodiments in which the projector 14 forms part of an integrated SGD assembly, such as that shown in FIG. 1, the orientation of the projector 14 may be adjustable within the housing 16. For example, the projector 14 may be configured to be manually adjustable (e.g., by configuring the projector 14 to be swiveled within housing 16) or can be configured to be electronically adjustable (e.g., by coupling the projector 14 to a motor, such as a servo-motor, that can automatically adjust the orientation of the projector 14).

The use of projectors, and particularly pico projectors, with a speech generation device generally may offer numerous advantages, especially in comparison to conventional SGDs that utilize relatively large display devices/panels as the primary output feature for the SGD. In particular, pico projectors are typically small in size. As such, the SGD of the present subject matter may be configured as a relatively compact device, thereby reducing the weight and increasing the portability of the SGD. Pico projectors are also generally characterized by low power consumption and, thus, provide for longer battery life. Thus, the reduced weight and power requirements of a pico projector provide particular advantages for a speech generation device because more lightweight and efficient devices help increase a potential user's mobility and duration of assisted communication. Furthermore, when a projector is provided as an output feature for a speech generation device, SGD content may be projected onto various surfaces and may be displayed in a wide range of sizes (e.g., by adjusting the projection lenses of the projector or by indirectly projecting images onto the projection surface). As such, a user may be provided with several different options for displaying and/or interacting with the communication screens, graphical user interfaces and other visual content of the SGD. Such flexibility generally allows for the instant availability of communication for the user regardless of the setting. For example, as indicated above, a user may choose to project SGD content onto the desk or table at which the user is sitting. Alternatively, SGD content may be enlarged and displayed on a wall or other vertical surface so that the user may view such content from a distance and/or share the content with others in his environment.

Still referring to FIG. 1, the optical input device(s) 18 of the present subject matter generally may comprise any device(s) known in the art that utilizes optical sensing in order to detect the movement and/or location of an object and/or the head/facial feature of the user. For example, in one embodiment, the optical input device(s) 18 may be configured to capture images and/or reflected light corresponding to the location and/or movement of an input object 30, such as a user's finger. As such, input actions (e.g., pointing or touching actions) directed at the projected display 26 may be captured by the optical input device(s) 18 and recognized by the central processing unit 12 as user inputs for making selections of or otherwise interacting with the projected SGD content. Additionally, in an alternative embodiment, the optical input device(s) 18 may be configured to receive inputs corresponding to the location and/or movement of a user's head and/or other facial feature (e.g., the user's nose). In other words, the optical input device(s) may permit the SGD 10 to utilize head tracking/mapping or other feature tracking/mapping as a source of user inputs.

As indicated above, to enable the SGD 10 of the present subject matter to provide a touch/point sensitive projected display 26, the central processing unit 12 may be configured to implement computer-readable instructions relating to various known techniques and/or methods for tracking/mapping and/or determining the location/movement of an input object 30 based on images and other imagery data received from the optical input device(s) 18. For instance, one or more of a video-based system (e.g., a video-based two-dimensional tracking system or a video-based three-dimensional mapping system), a time-of-flight (TOF) analysis, a thermal imaging system, an acoustic tracking system, and the like may be utilized to determine the position of one or more input objects 30 pointing at and/or touching the projected display 26. In particular, in one embodiment, the central processing unit 12 may be configured to employ a suitable mapping function (e.g., a second or third order polynomial function) to map the two-dimensional or three-dimensional images provided by the optical input device(s) 18 against the coordinate space of the projected display 26. As such, the position of the input object 30 may be correlated to a cursor position on the projected display 26, thereby permitting particular graphical user interface elements or buttons 28 to be selected by a user and/or providing for a particular action to be performed by the SGD 10 (e.g., scrolling up/down on the projected display 26). Thus, it should be appreciated that the optical input device(s) 18 generally may comprise any optical sensor(s) and/or camera(s) configured to enable the SGD 10 of the present subject matter to apply such techniques, methods and/or mapping functions. For example, suitable optical input devices 18 may include, but are not limited to, photodiodes, photodetectors, phototransitors, CMOS sensors, CCD sensors, photodiode arrays, photodetector arrays, phototransitor arrays, CMOS arrays, CCD arrays, cameras, videos cameras, TOF cameras, RGB cameras, thermal sensors and the like.

Detailed descriptions of suitable methods that may be utilized within the scope of the present subject matter to provide a point/touch sensitive projected display are disclosed in U.S. Pat. No. 5,534,917 (MacDougall), U.S. Pat. No. 6,323,942 (Bamji), U.S. Pat. No. 7,058,204 (Hilldreth), U.S. Pat. No. 7,227,526 (Hilldreth); U.S. Pat. Pub. Nos. 2007/0222760 (Lieberman), 2009/0122028 (ing), 2009/0200453 (Lieberman), 2008/0093542 (Lieberman), 2008/0068353 (Lieberman), 2008/0047762 (Lieberman), 2008/0013913 (Lieberman); and International Pub. Nos. WO 2008/146098 (Berget), WO 2010/073024 (Lawrence), and WO 2010/073045 (Lawrence), all of which are hereby incorporated by reference herein in their entirety for all purposes. Additionally, commercial products incorporating suitable optical tracking/mapping techniques are available from GestureTek of Sunnyvale, Calif. and Light Blue Optics of Cambridge, United Kingdom.

It should be appreciated that, depending on the technique and/or method being utilized to detect the location of the input object 30, the type and/or amount of optical input device(s) 18 may vary significantly. For example, in an embodiment in which the central processing unit 12 is configured to implement a video-based three-dimensional mapping system, the SGD 10 of the present subject matter may include multiple optical input devices 18. Thus, as shown in the embodiment of FIG. 1, when first and second cameras 20, 22 are used as optical input devices 18, the cameras 20, 22 may be mounted or otherwise embedded within or to the housing 16 of the SGD 10 such that sufficient imagery data may be captured regarding the area surrounding the projected display 26 and, in particular, regarding the position of the input object 30 relative to the projected display 26. For instance, in a particular embodiment of the present subject matter, the first camera 20 may comprise a time-of-flight camera for capturing distance or depth information relating to the position of the input object 30 and the second camera 22 may comprise a color or red-green-blue (RGB) camera for providing further imagery data corresponding to the input object's location. Accordingly, when such data is combined and processed by the central processing unit 12 utilizing known mapping algorithms, a suitable mapping function may be developed to enable the SGD 10 of the present subject matter to accurately detect the location of the input object 30 (e.g., the user's finger) as it is pointing at, touching or otherwise directed towards a portion of the projected display 26. It should also be appreciated that the use of multiple optical input devices 18 also may facilitate and/or improve the optical tracking of multiple input objects 30, such as two or more of the user's fingers.

In various other embodiments of the present subject matter, the optical input device 18 need not comprise multiple devices. For example, to permit the SGD 10 to utilize a video-based two-dimensional tracking system, the optical input device 18 may simply comprise a single camera or light sensor configured to capture images of and/or light reflected off of the input object 30 as it is pointed at and/or touches the projected display 26. Such images may then be transmitted to the central processing unit 12 and mapped against the two-dimensional coordinate space of the projected display 26 to enable the position of the input object 30 to be accurately determined.

In another embodiment, the optical input device 18 may comprise a thermal imaging sensor configured to track the location of a user's finger by sensing the body heat generated by the user's finger. Additionally, in further embodiments, a light source 38, such as a lamp, light emitting diode (LED), infrared LED, coherent light source, or the like, may be mounted or otherwise embedded within or to the housing 16 (e.g., in a location substantially adjacent to the optical input device(s) 18) to enhance and/or facilitate tracking and/or recognition of the input object 30, Such embodiments may be particularly advantageous when the SGD 10 of the present subject matter is being used in a low-light environment. For instance, reflective materials, colored tape and the like may be disposed on the input object 30 such that light emitted from the light source 38 may be reflected off of such material or tape and captured by the optical input device 18. Of course, when the light source 38 comprises an IR light source (e.g., an IR LED), the use of reflective materials and/or tape may not be necessary as a suitable IR detecting optical input device 18 may be provided to detect IR light reflected off of the input object 30. Additionally, as will be described in detail with reference to the particular embodiment of FIG. 2, IR light sources may be configured to produce a relatively planar light distribution that, when disrupted by an input object 230, may be detected by any suitable light sensor.

It should be appreciated that the central processing unit 12 also may be provided with suitable software instructions enabling the processing unit 12 to properly calibrate the optical input device 18 and/or to provide an initial mapping of the coordinate space of the projected display 26. In general, standard interactive calibration processes are known in which the user may be prompted to consecutively touch or point at calibration points projected (randomly or not) onto the projection surface 24 using the input object 30 (e.g., the user's finger, a stylus, or other pointing device). Such calibration techniques generally may use any number of calibration points ranging, for example, from one to sixteen points. Thus, in one embodiment, calibration points may be displayed along the perimeter of the projected display 26 and at various locations within the area of the display 26 in order to fully map the surface area occupied by the projected display 26. Once this calibration process is completed, images of the input object 30 captured by the optical input device 18 may be mapped to its relative point on the projected display 26 using any suitable mathematical function. Thus, for two-dimensional tracking, a suitable equation may include: $(Xs, Ys) = F(Xi, Yi)$ with F being the mapping function, (Xs, Ys) the display coordinates of the projected display 26 on the projection surface and (Xi, Yi) the location of the input object 30 drawn from the images provided by the optical input device(s) 18.

In order to evaluate the success of the calibration procedure, a test may be conducted as follows. The user may be asked again to touch and/or point at several points displayed on the projected display 26 using the input object 30, the locations of the input object 30 are estimated using the mapping function, and an average error (in pixels) is computed between the actual points and the estimated ones. If the error is above a threshold, then the user may be required to re-calibrate.

It should also be appreciated that, instead of using an input object 30 to point at and/or touch the projected display 26, other input mechanisms may be utilized with the speech generation device of the present subject matter to provide user inputs to the SGD 10. For example, in one embodiment, a coherent light source (e.g., a laser) or other light source capable of providing a relatively narrow beam of light may be utilized to provide user inputs by emitting a beam of light onto the projected display 26. The location of the light beam on the projected display 26 may then be detected by the optical input device(s) 18 and mapped by the central processing unit 12 against the coordinate space of the projected display 26 using any suitable mapping function. In a particular embodiment, a hand-held laser emitting device, such as a laser pointer, may be utilized by the user to provide selection inputs of the graphical user interface elements 28 displayed on the projected display 26. Alternatively, the laser emitting device may be attached to the user's head such that the position at which the beam of light is directed onto the projected display 26 may be adjusted simply by user head movements. Such a head-mounted device may be particularly advantageous for a user that has limited motor control and may not be capable of accurately pointing at and/or touching specific locations on the projected display 26 using his finger or other input object.

Further, in several embodiments of the present subject matter, the orientation of the optical input device(s) 18 may be adjustable in order to accommodate the various display options provided by the disclosed SGD 10. For example, as shown in FIG. 1, the cameras 20, 22 may be disposed within a rounded module that permits the orientation of the cameras 20, 22 to be adjusted manually and/or automatically (e.g., using a servo motor). Thus, in embodiments in which the orientation of the projector 14 is also adjustable, the field of view of the optical input device(s) 18 may be adjusted to generally correspond to the location at which the projector 14 is displaying the projected display 26. In particular, as shown in FIG. 1, the cameras 20, 22 may be oriented substantially downwardly in the direction of the projection surface 24. However, in an embodiment in which the projector 14 is oriented differently (e.g., in the embodiment illustrated in FIG. 6) the cameras 20, 22 may be oriented in a forward direction such that images of the area surrounding the projected display 26 may be captured. Of course, it should be appreciated that, in alternative embodiments, the optical input device(s) 18 may be configured as separate, peripheral device(s) of the SGD 10, such as a USB camera, configured to be coupled to the housing 16 via a wired or wireless connection. As such, the orientation of the optical input device(s) 18 may be adjusted by simply moving, tilting or otherwise reorienting the entire device or a portion of the device.

The adjustable configuration of the optical input device(s) 18 also may provide for flexibility in the input methods available to the user of an SGD 10. For example, as an alternative to providing inputs by touching and/or pointing at the projected display 26, the orientation of the cameras 20, 22 may be adjusted such that images of the user's head may be captured. As such, the cameras 20, 22 may permit the SGD 10 to capture user inputs using head tracking/mapping and/or other facial feature (e.g., nose) tracking/mapping. It should be appreciated that, generally, many or all of the same techniques and/or methods described in relation to tracking/mapping an input object 30 may be applied to track a user's head or other facial feature and, thus, a detailed description will not be provided herein.

However, in one embodiment, multiple optical input devices 18, such as cameras 20, 22, may provide imagery data that permits the central processing unit 12 to develop a three-dimensional mapping function for determining the head pose of the user. In other words, the central processing unit 12 may be provided with suitable image processing software capable of converting the imagery data transmitted from the optical input devices 18 into a suitable mathematical function that may be used to track the location and/or movement of the user's head and/or other facial feature. Thus, in a particular embodiment, when a user moves his head to the left or right, a cursor shown on the projected display 26 may likewise be moved to the left or the right. Similarly, when the user tilts his head up or down, the cursor position may be moved up or down. Of course, it should be appreciated that various other head and/or facial feature movements may be capable of being recognized by the central processing unit 12 and associated as specific user inputs corresponding to particular actions to be implemented by the SGD.

Moreover, the optical input device(s) 18 also may be utilized to permit the central processing unit 12 to implement optical hand gesture technology so as to provide even more flexibility with regard to the input methods available to the user. In particular, in addition to the pointing and/or touching gestures described above, the SGD 10 may be configured to recognize numerous other hand gestures (e.g., simplified sign language-type gestures) as user inputs. Of course, it should be appreciated that, to implement such additional gesture technology, the central processing unit 12 may be capable of executing suitable image processing routines configured to analyze and recognize the plurality of different hand gestures that may be performed by the user and captured by the optical input device(s) 18. In one embodiment, such hand gestures may then be correlated to various different actions to be performed by the SGD 10. As a non-limiting example, the SGD 10 may be configured to associate a "thumbs up" gesture as an input selection of an object or button displayed on the projected display 24. As another non-limiting example, if the user points his finer to the left or to the right, objects, buttons or other screens displayed to the user on the projected display 24 may be scanned or highlighted in that particular direction. Further, in another embodiment, hand gestures performed by the user may be correlated to various different utterances commonly used by the user. Thus, as one non-limiting example, if the user waves his hand within the field of view of the optical input device(s), the SGD may be configured to output "Hello" or "How are you doing" through its speaker(s) 36. Of course, it should be appreciated that various other hand gestures corresponding to any number of other SGD actions and/or spoken utterances may be programmed into the processing unit 12 so as to be recognizable by the SGD 20.

Referring still to FIG. 1, in one embodiment, the SGD's housing 16 generally may serve as a protective casing or covering for the central processing unit 12, projector 14, optical input device(s) 18 and any other components and/or features of the SGD 10 disposed therein or mounted thereon. As such, it should be appreciated that the housing 16 may be formed or molded from any substantially rigid and/or durable material. For example, in one embodiment, the housing 16 may be formed from a material such as, but not limited to, one or more of plastic, thermoplastic, polymer, polyethylene, metal, and/or resin materials. In another embodiment, the housing 16 may be formed from any suitable metal, such as magnesium or an alloy thereof. Additionally, it should be appreciated that, in one embodiment, the housing 16 may be rendered liquid impermeable when formed.

The housing 16 also may define various openings to accommodate data input and output as well additional features of the SGD 10. For example, an opening may be defined in the housing 16 to provide a location for a power button 32 by which the user can toggle power for the SGD to "on" or "off" positions. Another opening may be defined in the housing 16 to permit a volume knob or one or more volume control buttons 35 to be accessible to the user for controlling the volume of the audio output provided by the speakers 36 of the SGD 10. Moreover, openings may provide a location for data input/output ports. For example, a location for USB ports or other communicative ports 34 may be provided for coupling peripheral devices of the SGD 10 to the central processing unit 12. Further, openings may be defined through the housing 16 to permit the mounting or embedding of one or more speakers 36 for providing audio output for the SGD 10.

As indicated above, it should be appreciated that, although the SGD 10 of the present subject matter is generally described herein as being configured as an integrated assembly, the various components of the SGD 10 also may be disposed separate from one another. Thus, in several embodiments, the projector 14, the optical input device(s) 18 or both may be configured as separate, peripheral device(s) and may be communicatively coupled to the central processing unit 12 via a wired or wireless connection. For example, as shown in FIG. 6, the projector 614 may be disposed in a remote relationship to the housing 612 and may be coupled to the central processing unit (not illustrated) through a cable 640, such as a USB cable, connected to the communicative port 628 defined in the housing 612. Alternatively, the projector 614 may be coupled to the processing unit via any suitable wireless connection. In other embodiments, the central processing unit 12 may be disposed within a separate housing module located apart from the projector 14 and/or optical input device 18. For instance, as shown in FIG. 3, the central processing unit 326, 326' may be provided in a distal relationship with the components disposed in the SGD housing 312 and thus, may be communicatively coupled to the projector 314, optical input device(s) 312 and any other components of the SGD 310 via a wired or wireless connection.

Figure 2:
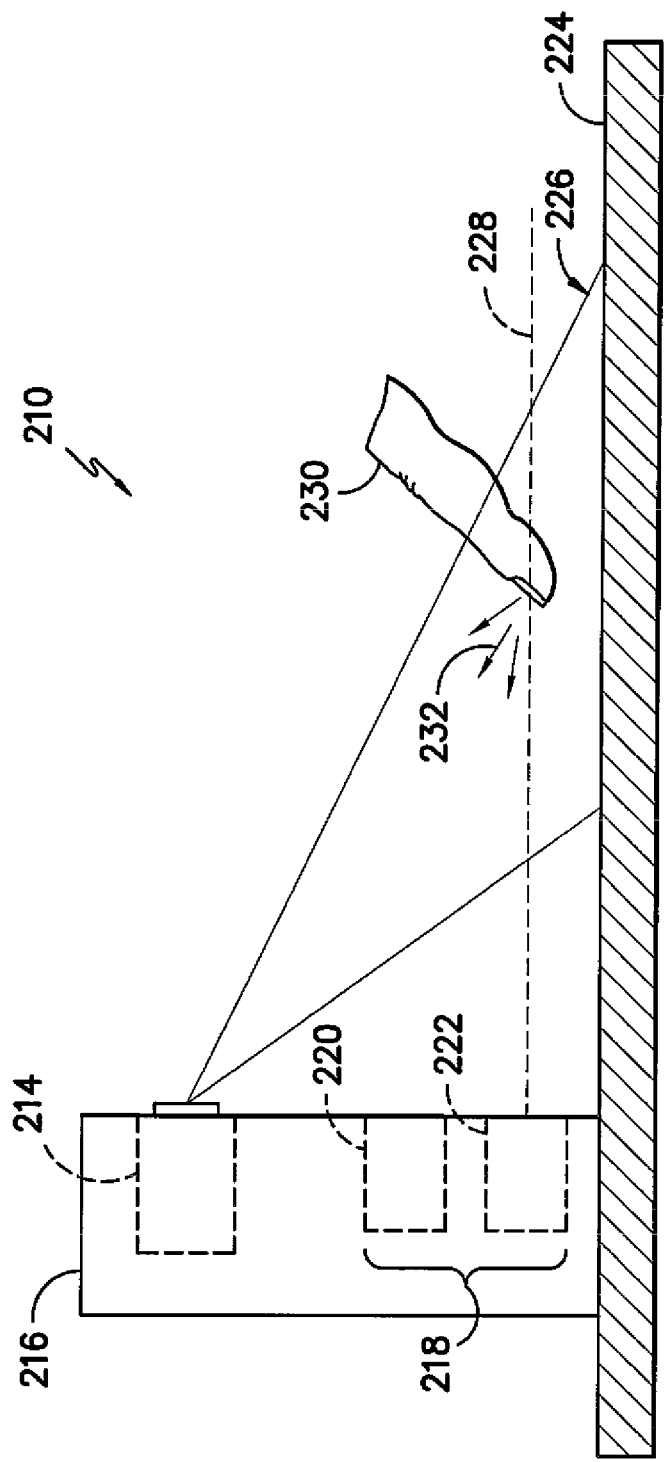
FIG. 2 illustrates a side view, partially in cross-section and with items normally hidden from view being indicated by dashed lines, of another exemplary embodiment of a speech generation device in accordance with aspects of the present subject matter.

Referring now to FIG. 2, there is illustrated another exemplary embodiment of an SGD 210 in accordance with aspects of the present subject matter. In general, the illustrated SGD 210 may include some or all of the components and/or features described in reference to FIG. 1. Thus, the SGD 210 may include a projector 214 and an optical input device(s) 218 communicatively coupled to a central processing unit (not illustrated) of the SGD 210 via a wired or wireless connection. Additionally, a housing 216 of the SGD 210 may be configured to house the projector 214, optical input device(s) 218 and various other components of the SGD 210 (e.g., one or more speakers).

As shown in FIG. 2, the optical input device(s) 218 generally may comprise both an optical sensor(s) 220 and an associated light source(s) 222 for detecting the location and/or movement of an input object 230 pointed towards and/or touching the projected display 226. In particular, the light source 222 may be configured to project a light distribution 228 substantially adjacent to the projected display 226. Additionally, the optical sensor 220 may be configured to detect a change in the light distribution by sensing the light 232 redirected due to scattering, refraction, diffraction or the like caused by the input object 230 being placed into the light distribution 228. It should be appreciated that the light source 222 may comprise any suitable light source, such as an LED, lamp or coherent light source. In an exemplary embodiment, the light source 222 may comprise an infrared (IR) light source, such as an IR light emitter. Similarly, the optical sensor 220 may comprise any suitable optical sensor and/or camera, such as the various optical sensors and cameras described above with reference to FIG. 1.

Referring still to FIG. 2, the illustrated embodiment generally may be advantageous when the projector 214 of the present subject matter is configured to project SGD content onto the flat surface, such as a table or desk, on which it is placed. In particular, the light source 222 may be configured to produce a light distribution 228 generally corresponding to a planar sheet of light emitted directly above the projection surface 224, such as at a height of less than 20 millimeters (mm) or less than 10 mm or less than 5 mm. In one embodiment, the planar light distribution 228 may be emitted substantially parallel to the projection surface 224. By positioning the light distribution 228 directly above the projection surface 224, it should be appreciated that input selections may be provided to the SGD 210 without a user having to physically touch the projection surface 224 with the input object 230. Rather, as indicated above, a user may provide inputs by simply pointing the input object 230 at the projected display 226.

To facilitate detection of the input object 230, the optical sensor 220 generally may be disposed at any suitable location at which light 232 scattered from the light distribution 228 may be sensed. Thus, when an input object 230 is used to point at and/or touch a location on the projected display 226 (e.g., when a user desires to provide an input to the SGD 210 by selecting a button or otherwise interacting with a graphical user interface), any disturbance in the light distribution 228 may be detected by the optical sensor 220. As indicated above, such a disturbance may be caused by the user's finger or another input object 230 being placed into or inserted through the light distribution 228 such that the light 232 emitted from the light source 222 is scattered or otherwise disrupted. This scattered light 232 may then be detected by the optical sensor 220, transmitted to the central processing unit (not illustrated) of the SGD 210 and subsequently utilized to determine a location of the user's finger or other input object 230 relative to a location on the projected display 226.

In particular, as described above, the central processing unit may include suitable computer-readable instructions (e.g., gesture recognition software) capable of correlating the inputs received from the optical sensor 220 to the location of the particular buttons, menus and other graphical user interface elements projected onto the projection surface 224. Additionally, any suitable calibration technique may be executed by the central processing unit such that the processing unit can develop a suitable mapping function for estimating the position of the input object 230 relative to the projected display 226. This mapping function may then be used to provide a cursor position on the projected display 226 corresponding to the location of the input object 230 to enable a user to provide inputs to the SGD 210.

Referring now to FIG. 3, a further exemplary embodiment of a speech generation device 310 is illustrated in accordance with aspects of the present subject matter. In general, the illustrated SGD 310 may include some or all of the components and/or features described with reference to FIGS. 1 and 2. For example, the SGD 310 may include a central processing unit 326, 326', projector 314, optical input device(s) 316 and various other components. However, unlike the above described embodiments, the projector 314, optical input device(s) 316 and other suitable components (e.g., one or more speakers) of the SGD may be configured to be worn by the user 318.

In particular, as shown in FIG. 3, the projector 314 and optical input device(s) 316 may be attached to and/or disposed within a housing 312 configured as a pendant or other suitable item that may be worn around or otherwise attached to a user's neck or torso. In alternative embodiments, it should be appreciated that the housing 312 may be mounted or secured to any other suitable portion of the user's body. For example, the housing 312 may be attached around the user's waist. Alternatively, the projector 314 and optical input device(s) 316 may be attached to and/or disposed within an item configured to be worn on the user's head, such as a pair of sunglasses, a helmet or other suitable head-mounted item, Regardless, such exemplary configurations may permit the SGD 310 of the present subject matter to be configured as a portable device that may utilized at any location in which a suitable projection surface 320 may be accessible to the user 318.

In FIG. 3, SGD content in the form of buttons, menus and other graphical user interface elements 324 may be projected by the projector 314 onto any projection surface 320, such as a wall, screen or any other suitable surface. To ensure that the optical input device(s) 316 is correctly oriented relative to the projected display 322 of the projector 314, the orientation of the such components may be fixed within the housing 312 with respect to one another. Thus, the optical input device(s) 316 may be configured to have a field of view angle generally corresponding to the angle at which the projector 314 is designed to project images onto the projection surface 320. As such, the optical input device(s) 316 may be capable of capturing images and/or other suitable imagery data relating to the position of the user's finger or other input object regardless of the surface on which the projected display 322 is projected. Of course, it should be appreciated that, as described above, the optical input device(s) 316 generally may be configured to detect user actions pointing at, touching or otherwise directed towards the projected display 322. As such, inputs provided by the optical input device(s) 316 may be analyzed by the central processing unit 326, 326' using any suitable tracking/mapping algorithms in order to provide a press/touch sensitive projected display 322 capable of recognizing such actions as user inputs.

Additionally, as shown in FIG. 3, the central processing unit 326, 326' of the SGD 310 generally may be disposed in a distal relationship to the projector 314 and optical input device(s) 316. In particular, the central processing unit 326, 326' may be attached to and/or disposed within a separate housing module 328, 328' located on or attached to the user 318. Thus, as shown, the housing module 328 may be stored in a backpack 334 worn by the user 318. In another embodiment, also shown in FIG. 1, the central processing unit 326' and housing module 328' may be connected to the user's clothes (e.g. the user's belt 336) through a belt clip or any other suitable mechanical fastener. Of course, it should be appreciated that the housing module may be stored on or in any other item that is sufficiently close to the user 318 to allow communication between the projector 314, optical input device(s) 316 and the processing unit 326, 326' via a wired or wireless connection. For instance, in various embodiments, the housing module may be disposed in a user's pocketbook, knapsack, shirt pocket, pants pocket and the like. Alternatively, the housing module may be mounted to the user's wheelchair or other personal mobility device. By separating the central processing unit 326, 326' from the projector 314 and the optical input device(s) 316, it should be appreciated that the housing 312 may be configured to be relatively compact. As such, the housing 312 may be worn around the user's neck or may be otherwise attached to the user 318 without looking awkward and/or without burdening the user 318.

Figure 4:
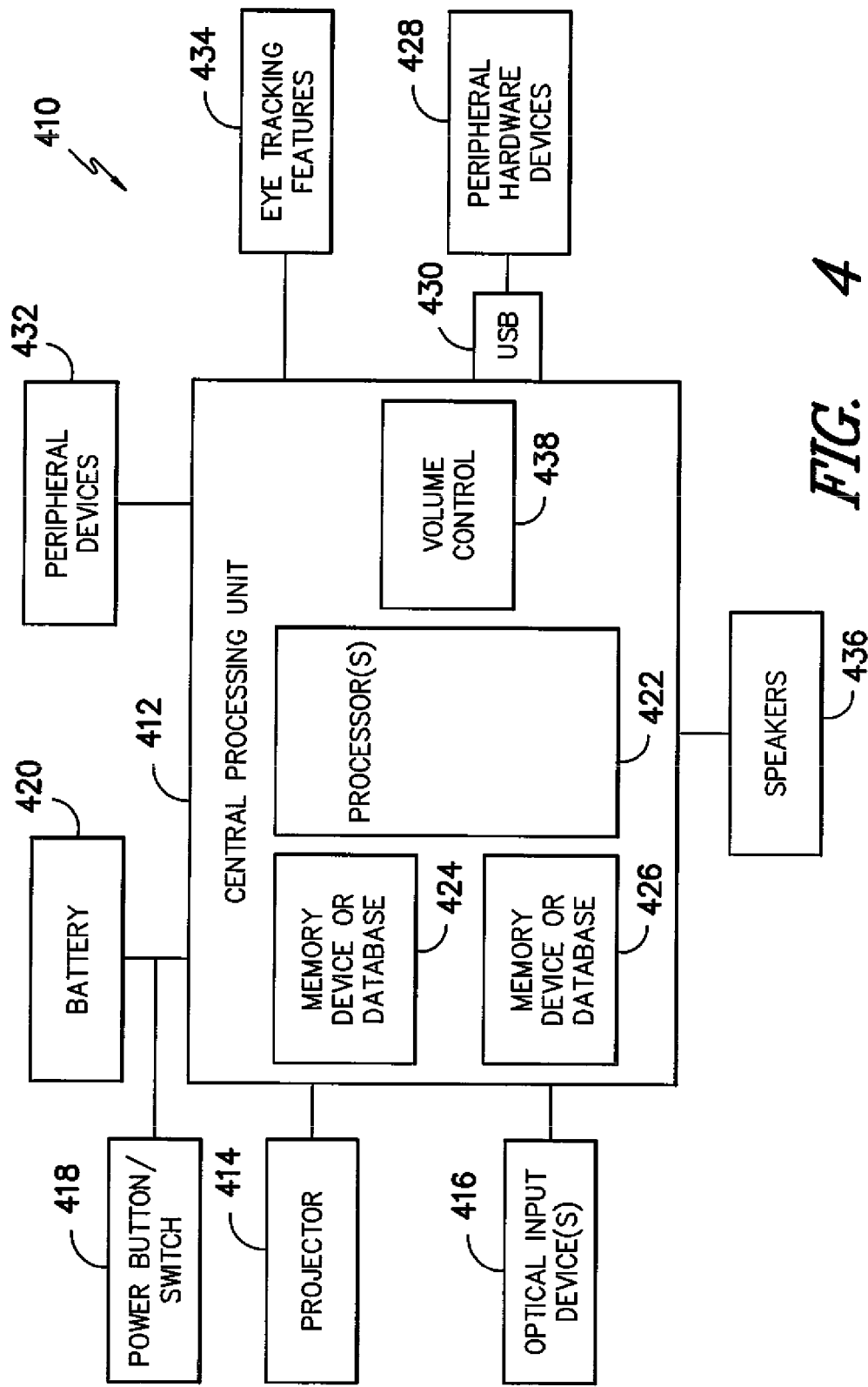
FIG. 4 illustrates a schematic diagram of hardware components for use within an embodiment of a speech generation device in accordance with aspects of the present subject matter.

Referring now to FIG. 4, various electronic components intended for selective use with a speech generation device in accordance with aspects of the present subject matter are illustrated. Generally, the electronic components may include a combination of hardware, software and/or firmware elements, all of which either correspond to physical tangible apparatuses or which are embedded as instructions on a physical and tangible apparatus such as a computer-readable storage medium. It should be appreciated that the components shown in FIG. 4 may be provided in different configurations and may be provided with different arrangements of direct and/or indirect physical and communicative links to perform the desired functionality of such components.

In general, the electronic components of an SGD enable the device to transmit and receive messages to assist a user in communicating with others. For example, the SGD may correspond to a particular special-purpose electronic device that permits a user to communicate with others by producing digitized or synthesized speech based on configured messages. Such messages may be preconfigured and/or selected and/or composed by a user within a message window provided as part of the speech generation device user interface. As will be described below, a variety of input devices and software interface features may be provided to facilitate the capture of user input to define what information should be displayed in a message window and ultimately communicated to others as spoken output or other outgoing communication.

Referring to FIG. 4, the SGD 410 generally may include a central processing unit 412, a projector 414, and various other peripheral components and features, such as one or more optical input devices 416 and/or eye tracking features 434. The central processing unit 412 and various other components of the SGD 410 will be generally described with reference to FIG. 4. The projector 414 and optical input device(s) 416 have been generally described above with reference to FIGS. 1-3. Additionally, the eye tracking features 434 will be generally described with reference to FIGS. 5-8. Moreover, in addition to the specific devices discussed herein, it should be appreciated that any peripheral hardware device 428, 432 may be provided and interfaced to the speech generation device 410 via any suitable communicative coupling, such as USB port 430, or via a suitable wireless communications protocol.

Power to the components of the SGD 410 generally may be provided from a battery 420, such as but not limited to a lithium polymer battery or any other rechargeable energy source. For example, when the components of the SGD 410 are configured as an integrated assembly, power may be supplied to the central processing unit 412, projector 414, and any other components of the SGD 410 from a single battery 420 disposed within the SGD housing. Alternatively, in embodiments in which one or more of the SGD components are configured as separate devices (e.g., the projector 414 and/or optical input device(s) 416) and coupled to the SGD housing through a USB cable or other suitable cable, power from the battery 420 may be supplied to such devices through the connecting cable. In other embodiments, multiple batteries 420 may be utilized to supply electric power to the various SGD components. For instance, when one or more of the SGD components are configured as separate devices and are communicatively coupled to the central processing unit 412 through a wireless connection, it may be desirable to have a first battery 420 for supplying power to the central processing unit 412 and any other components disposed in the same housing as the central processing unit 412 and an additional battery(ies) 420 for supplying power to the separate, wirelessly-communicating SGD component(s). Additionally, a power switch or button 418 may be provided as an interface to toggle the power connection between the battery 420 and any powered components. For example, as shown in FIG. 1, a power button 32 may be located in an opening defined in the SGD housing 16.

Referring still to FIG. 4, the central processing unit 412 is generally provided to function as the central controller within the SGD 410 and generally may include such components as at least one memory/media element or database for storing data and software instructions as well as at least one processor. In the particular example of FIG. 4, one or more processor(s) 422 and associated memory/media devices 424 and 426 are configured to perform a variety of computer-implemented functions (i.e., software-based data services). The central processing unit 412 may be adapted to operate as a special-purpose machine by executing the software instructions rendered in a computer-readable form stored in memory/media element 424. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits. Additionally, the one or more processor(s) 422 within the central processing unit 412 may be configured for operation with any predetermined operating systems, such as but not limited to Windows XP, and thus is an open system that is capable of running any application that can be run on Windows XP. Other possible operating systems include Android OS, WebOS, BSD UNIX, Darwin (Mac OS X including "Cheetah," "Leopard," "Snow Leopard" and other variations), Linux, SunOS (Solaris/OpenSolaris), and Windows NT (XP/Vista/7).

At least one memory/media device (e.g., device 424 in FIG. 4) is dedicated to storing software and/or firmware in the form of computer-readable and executable instructions that will be implemented by the one or more processor(s) 422. Other memory/media devices (e.g., memory/media devices 426) are used to store data which also will be accessible by the processor(s) 422 and which will be acted on per the software instructions stored in memory/media device 424. The various memory/media devices of FIG. 4 may be provided as a single portion or multiple portions of one or more varieties of computer-readable media, such as but not limited to any combination of volatile memory (e.g., random access memory (RAM), such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. In some embodiments, at least one memory device corresponds to an electromechanical hard drive and/or a solid state drive (e.g., a flash drive) that easily withstands shocks. Although FIG. 4 shows two separate memory/media devices 424 and 426, the content dedicated to such devices may actually be stored in one memory/media device or in multiple devices. Any such possible variations and other variations of data storage will be appreciated by one of ordinary skill in the art.

In one particular embodiment of the present subject matter, a first portion of memory/media device 426 is configured to store input data received from a user for performing the desired functional steps associated with a speech generation device. For example, data in memory 426 may include inputs received from one or more input devices of the SGD 410, including but not limited to the optical input device(s) 416, the eye tracking features 434 and/or other peripheral devices 428, 432, which may indicate a user's selections of language (e.g., language elements in the form of words, phrases, text, text and/or symbols) to be spoken by the SGD 410 or provide information needed by the SGD 410 to performs its various functions. Memory device 424 includes computer-executable software instructions that can be read and executed by processor(s) 422 to act on the data stored in memory/media device 426 to create new output data (e.g., audio signals, display/projector signals, control signals, other output from various image processing instructions, object and/or feature tracking/mapping software, eye tracking algorithms, gesture recognition software and the like) for temporary or permanent storage in one of the memory/media devices. Such output data may be later communicated to integrated and/or peripheral output devices, such as the projector 414, speakers 436, communication devices 440, other suitable output devices, or as control signals to still further components.

Referring still to FIG. 4, various input devices may be part of an SGD 410 and thus coupled directly or indirectly to the central processing unit 412. For example, as described above, one or more optical input devices 416 may be provided to permit user inputs directed towards the projected display to be captured and/or to enable head (or other facial feature) tracking and/or hand gesture recognition. Eye tracking features 434 also may be provided to capture user inputs by tracking the user's eye movement/location. Additionally, other exemplary input devices (e.g., peripheral devices 428, 432) may include but are not limited to a peripheral keyboard, peripheral microphone, one or more physical input switches and the like.

The different types of input devices (including optional peripheral devices) generally may be configured with software instructions to accept user inputs in accordance with one or more input selection methods including, but not limited to, point/touch, scanning, head tracking, gesture recognition and eye tracking selections methods. In a "point/touch" mode, selection may be made by either pointing to or touching a particular button or other graphical user interface element displayed on the projected display using any suitable input object, such as the user's finger, a stylus or other pointing device. As indicated above, an optical input device(s) 416 may be coupled to the central processing unit 412 such that the location of the input object relative to the projected image may be determined. As such, in one embodiment, a cursor (e.g., a mouse pointer) position may be displayed on the projected display which corresponds to the location at which the input object is pointing/touching in order to provide a visual indication of such location to the user In a "Scanning" mode, highlighting is used in a specific pattern so that individuals can use a switch (or other device) to make a selection when the desired object is highlighted. For example, the buttons and other graphical user interface elements projected onto the projection surface may be highlighted in a pattern (e.g., from left to right). The user may then use a physical switch to provide an input to the central processing unit 412 indicating a selection of the highlighted button or other interface element. It should be appreciated that the physical switch may be provided as a push-button or other input device mounted within an opening defined in the housing of the SGD 410. Alternatively, the switch may be configured as a wireless-communicating input switch configured to transmit inputs to the central processing unit 412 using any suitable wireless communications protocol. In such an embodiment, it should be appreciated that the physical switch generally may be disposed at any location that is easily accessible to the user.

In a "Head Tracking" mode, inputs are provided by a user's head movements when the SGD is outfitted with an optical input device(s) 416 capable of tracking/mapping a user's head and/or other facial features. Similarly, in a "Gesture Recognition" mode, selection is made by the performance of one or more hand gestures, with such gestures being detected by the optical input device(s) 416 and recognized by the central processing unit 412. Further, in "Eye Tracking" modes, selections are made simply by gazing at the projected display and implementing the selection based on dwell time, eye blinking or external switch activation, which will be described in greater detail below.

In general, the eye tracking features 434 may permit a user's eye gaze to be tracked relative to the user's point of regard on the projected display. For instance, the central processing unit 412 of the speech generation device 410 may be adapted to apply various image processing algorithms to images transmitted from an image capture device of the eye tracking features 434 so as to convert such images into a cursor position that may be shown on the projected images. In a particular embodiment, a mapping function, typically a second order polynomial function, may be employed to map eye gaze measurements from the two-dimensional images provided by an image capture device(s), such as a camera, to the two-dimensional coordinate space of the projected display. As such, the cursor position provided on the projected display may correspond to the user's eye gaze direction and, thereby, permit the user to make selections on the displayed user interfaces via any number of input selection methods.

In general, the eye tracking features 434 for use with the SGD 410 of the present subject matter may include such basic hardware elements as one or more image capture devices and one or more light sources. Such hardware elements may be coupled to any suitable processing equipment so as to function together to detect and analyze light reflected from the user's eyes. The image capture device(s) may include any number of devices suitable for capturing an image of a user's eyes. For example, image capture devices may include cameras, video cameras, sensors (e.g., photodiodes, photodetectors, CMOS sensors and/or CCD sensors) or other devices. Additionally, the light source(s) may include any number of lighting devices suitable for illuminating a user's eye(s) so that the image capture device(s) can measure certain identifiable features associated with the illuminated eyes.

Referring still to FIG. 4, SGD hardware components also may include one or more integrated output devices, such as but not limited to the projector 414 and one or more speakers 436. As indicated above, the projector 414 generally may correspond to any device capable of projecting menus, buttons or other graphical user interface elements onto any suitable surface. The speaker(s) 436 generally may correspond to any compact high power audio output device and may function as an audible interface for the speech generation device 410 when computer processor(s) 422 utilize text-to-speech functionality. In accordance with the general functionality of a speech generation device 410, a user provides text, symbols corresponding to text, and/or related or additional information in a "Message Window" displayed by the projector 414 which then may be interpreted by a text-to-speech engine and provided as audio output via the speaker(s) 436. Speech output may be generated in accordance with one or more preconfigured text-to-speech generation tools in male or female and adult or child voices, such as but not limited to such products as offered for sale by CereProc of Edinburgh, Scotland, Cepstral of Pittsburgh, Pa., HQ Voices offered by Acapela Group of Mons, Belgium, Flexvoice offered by Mindmaker of San Jose, Calif., DECtalk offered by Fonix of Salt Lake City, Utah, products by Loquendo of Torino, Italy, VoiceText offered by Neo-Speech of Sunnyvale, Calif., AT&T's Natural Voices offered by Wizzard of Pittsburgh, Pa., Microsoft Voices, digitized voice (digitally recorded voice clips) or others. Additionally, a volume control module 438 may be controlled by one or more scrolling switches.

The speaker(s) 436 of the present subject matter may be mounted or otherwise disposed at any suitable location relative to the user. For example, as shown in FIGS. 1 and 6, one or more speaker(s) 36, 630 may be mounted to and/or disposed within the SGD housing 16, 612. Alternatively, the speakers may be disposed in various other locations. For example, in one embodiment, the speakers 436 may be configured as a pendant to be worn around a user's neck. Thus, in the embodiment of FIG. 3, the speakers 436 may be mounted to and/or disposed within the housing 312 disposed around the user's neck or may be configured as a separate pendant to be worn along side such housing 312. Further, in the embodiment illustrated in FIG. 5, the speakers may be mounted to and/or disposed within the lap tray 520, the eye tracking device 528 or the housing 512 or may be disposed at any other suitable location, such as being mounted on or within the wheelchair 516. Given the flexibility in locating the speaker(s) 436 of the present subject matter, it should be appreciated that the speaker(s) 436 may be in communication with the central processing unit 412 using any suitable means. For example, in one embodiment, the speakers 436 may be communicatively coupled to the processing unit 412 through a BLUETOOTH connection or any other suitable wireless communications protocol.

Referring still to FIG. 4, additional hardware components that optionally may be included within the speech generation device 410 of the present subject matter may include various communications devices and/or modules, such as but not limited to, an antenna, a cellular phone or RF device, a wireless network adapter and an infrared (IR) transceiver. For example, an antenna may be provided to facilitate wireless communication between the components of the SGD 410 and/or between the SGD 410 and ether devices (eg a secondary computer and/or secondary display) in accordance with one or more wireless communications protocols, including but not limited to BLUETOOTH, WI-FI (802.11 b/g) and ZIGBEE wireless communication protocols. Additionally, a cellular phone or other RF device may be provided to enable a user to make phone calls directly and speak during the phone conversation using the SGD 410, thereby eliminating the need for a separate telephone device. A wireless network adapter may be provided to enable access to a network, such as but not limited to a dial-in network, a local area network (LAN), wide area network (WAN), public switched telephone network (PSTN), the Internet, intranet or ethernet type networks or others. In such an embodiment, it should be appreciated that executable instructions stored in memory associated with the central processing unit 412 may provide a web browser to serve as a graphical user interface for interacting with the Internet. For example, software instructions may make preconfigured web browsers, such as Microsoft Internet Explorer or Firefox® internet browser available from Mozilla software, accessible to the user. Further, an infrared (IR) transceiver may be provided to function as a universal remote control for the SGD 410 that may be capable of operating devices in the user's environment, for example including a TV, DVD player, and CD player.

It should be appreciated that, when different wireless communication devices are included within an SGD 410, a dedicated communications interface module may also be provided within the central processing unit 412 to provide a software interface from the processing components of processing unit 412 to the communication device(s). For example, communications interface module may include computer instructions stored on a computer-readable medium that instruct the communications devices how to send and receive communicated wireless or data signals.

As indicated above, it should be appreciated that all graphical user interfaces and other menus that display buttons or other features that are selectable by a user correspond to user input features that when selected trigger control signals being sent to the central processing unit 412 within an SGD 410 to perform an action in accordance with the selection of the user buttons. In accordance with disclosed technology, such graphical user interfaces are displayed visually by the projector 414 on the projected display. Some exemplary graphical user interfaces correspond to conventional "QWERTY" keyboards, numeric keypads, or other customized keypads with alphanumeric identifiers. Buttons also may include words, phrases, symbols and other information that can be customized based on user preferences, frequency or use or other parameters.

Buttons also may be provided by which a user can toggle additional menus and communication software screens such as preconfigured or customized compilations referred to herein as vocabulary lists or vocabulary list boxes. Vocabulary list boxes enable a user to have a wide variety of words and phrases immediately available. By listing groups of related words and phrases, vocabulary list boxes enable a user to quickly search through a wide range of text options when composing a message. For example, a user can select a particular group of words and/or phrases and associate all selected items into a new vocabulary list, which may be named and optionally assigned a unique symbol to visually represent the vocabulary list. Features also may be provided to trigger actions performed by the SGD 410 upon selection of an item from a vocabulary list, for example, to automatically "speak" or provide as audio output the words/phrases from a vocabulary list box immediately as it is selected by a user, or to send the words/phrases from the vocabulary list box to the Message Window as it is selected by a user.

Figure 5:
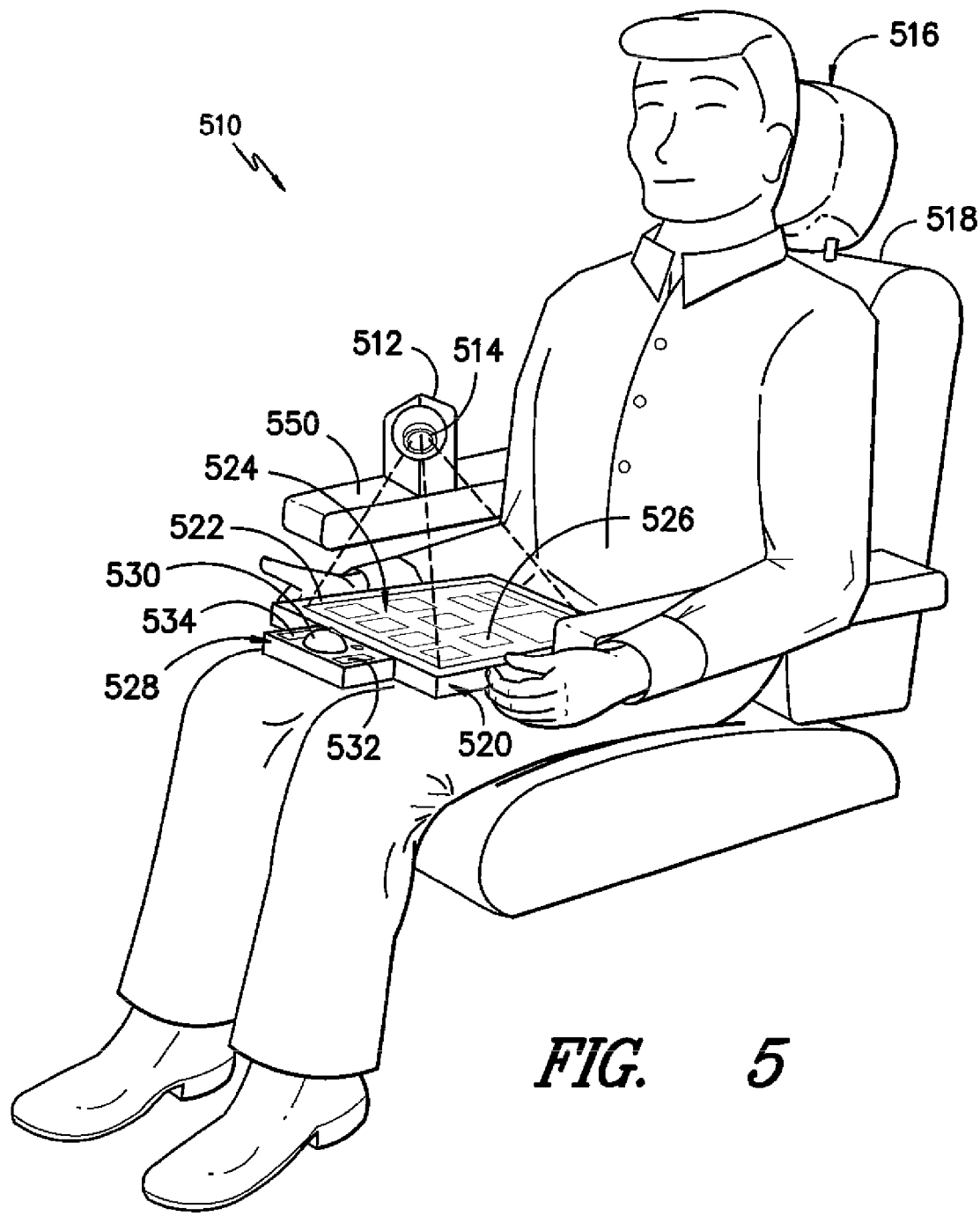
FIG. 5 illustrates a perspective view of yet another exemplary embodiment of a speech generation device in accordance with aspects of the present subject matter.

Referring now to FIG. 5, there is illustrated a still further exemplary embodiment of a speech generation device 510 in accordance with aspects of the present subject matter. As shown, the SGD 510 has been incorporated into a wheelchair 516, such as a standard or power wheelchair, with only the seat portion 518 of the wheelchair 516 being illustrated. The various components of a power wheelchair are described, for example, in International Patent Application entitled "SPEECH GENERATION DEVICE WITH SEPARATE DISPLAY AND PROCESSING UNITS FOR USE WITH WHEELCHAIRS" corresponding to International Publication No. WO 2011/044429, with an international filing date of Oct. 8, 2010, which is hereby incorporated herein by this reference in its entirety for all purposes.

In general, the illustrated SGD 510 may include some or all of the components and features described above in reference to FIGS. 1-4. For example, the SGD 510 may include a housing 512 configured as a protective casing for various components (e.g., the projector 514, the optical input device(s), the central processing unit and one or more speakers of the SGD). As shown, the housing 512 of the SGD 510 may be mounted to a portion of the wheelchair 516 (e.g., the armrest 550) or to any other suitable item so that SGD content, such as buttons, graphical user interface elements 526 and the like, may be projected onto a lap tray 520 or other suitable projection member configured to rest on the user's lap. However, in alternative embodiments, it should be appreciated that the mounted projector 514 may be configured to project SGD content onto any other suitable surface, such as onto an adjacent wall or onto a projection screen mounted in front of the user.

Moreover, the illustrated SGD 510 also may include eye tracking features in the form an eye tracking device 528 configured to capture user inputs by tracking a user's eye gaze. Specifically, as shown in FIG. 5, the eye tracking device 528 may be disposed substantially adjacent to the projected display 524 such that images of the user's eyes may be captured as the user views the projected display 524. Of course, it should be appreciated that the eye tracking device 528 generally may be provided in addition to, or as an alternative to, the optical input device(s) as a source for providing user inputs to the SGD. For example, in the illustrated embodiment, one or more optical input devices (generally configured as described above) may be mounted to or disposed within the housing 512 and may be configured to capture images of user actions directed towards the lap tray 520 (e.g., pointing at and/or touching the projection surface 522) and/or may be configured to facilitate implementation of head tracking and/or gesture recognition technology.

The eye tracking device 528 of the present subject matter generally may comprise any suitable device that permits a user's eye gaze to be tracked relative to the user's point of regard on the projected display 524. To enable such tracking, the eye tracking device 528 generally may be disposed substantially adjacent to the projected display 524. Thus, as shown in FIG. 5, the eye tracking device 528 may be mounted to a portion of the lap tray 520 such that the device 528 may capture images of and otherwise track the user's eyes.

Images captured by the eye tracking device 528 may be transmitted to the central processing unit (not illustrated) of the SGD 510 such that the various image processing and/or tracking algorithms stored within the processing unit may be utilized to convert such images into a cursor position displayed onto the projected display 524. Thus, it should be appreciated that the eye tracking device 528 may be communicatively coupled to the central processing unit using any suitable means. For example, in one embodiment, the eye tracking device 528 may be in communication with the processing unit via any suitable wireless communications protocol. Alternatively, a wired connection may be established between the eye tracking device 528 and the central processing unit. For instance, in a particular embodiment, a USB port or other communicative port may be defined in the eye tracking device 528 such that a suitable communicative cable may be utilized to couple the device 528 to the central processing unit.

In general, the eye tracking device 528 may include one or more image capture devices and one or more light sources. For example, as shown, the eye tracking may video camera 530 and a pair of light sources (e.g., a left infrared LED array 532 and a right infrared LED array 534) mounted within a casing or other housing. The video camera 530 may generally be configured to capture images of the user's eyes and may include a corresponding focusing lens (not illustrated) mounted within an adjustable lens housing disposed within eye tracking device 528 and in front of the video camera 530. The LEDs in each respective infrared LED array 532, 534 desirably emits at a wavelength of about 880 nanometers, which is the shortest wavelength deemed suitable in one exemplary embodiment for use without distracting the user (the shorter the wavelength, the more sensitive the sensor, e.g., video camera 530, of the eye tracking device 528). However, LEDs 532, 534 operating at wavelengths other than about 880 nanometers easily can be substituted and may be desirable for certain users and/or certain environments. A plurality of LEDs (e.g., 10-50 LEDs) may be disposed in staggered, linear or other configurations in each array 532, 534. It should be appreciated that respective transparent protective covers also may be provided over each of the LED arrays 532, 534.

It should also be appreciated that the disclosed eye tracking device 528 generally may be utilized with any embodiment of the present subject matter as a means for providing user inputs to a speech generation device and, thus, need not be limited to the embodiment illustrated in FIG. 5. For example, in the embodiment shown in FIG. 1, an eye tracking device 528 may be included as an additional input device for the SGD 10 or as an alternative to the optical input device(s) 18. For example, the eye tracking device 528 may be disposed on the projection surface 24 substantially adjacent to the projected display 26 and may be coupled to the central processing unit 12 through the USB ports 34 defined in the housing 16. Alternatively, the eye tracking features (e.g., the camera 530 and light source(s) 532, 534) of the eye tracking device 528 may be embedded or otherwise disposed within the housing 16 together with the optical input device(s) 18. In an even further embodiment, the optical input device(s) 18, itself, may be utilized as an eye tracking device. For example, in embodiments in which the orientation of the optical input device(s) 18 is adjustable, the optical input device(s) 18 may be adjusted such that images of the user's eyes may be captured by the device(s), such as by camera 20 and/or camera 22.

Still referring to FIG. 5, the lap tray 520 generally may be configured to provide a projection surface 522 for the projected display 524. Thus, it should be appreciated that the lap tray 520 may comprise any panel, screen or other suitable surface for displaying projected images. For example, in one embodiment, the lap trap 520 may be configured as a rectangular-shaped member having at least one substantially non-transparent surface so that images projected onto the substantially non-transparent surface may be viewed by the user. Additionally, as shown, the lap tray 520 may comprise as a separate, peripheral component which may be adapted to rest on the user's lap and/or may be configured as a hand-held tray. As such, the lap tray 520 can be stored at any suitable location (e.g., underneath the seat 518 of the wheelchair 516) when the SGD 510 is not being utilized by the user. Alternatively, the lap tray 520 may be mounted to a portion of the wheelchair 516 (e.g., the seat 518 or the armrest 550) so that the lap tray 520 may be rotated, slid or otherwise moved onto or adjacent to the user's lap when he desires to use the SGD 510.

Moreover, as indicated above, it should also be appreciated that the projector 514 of the illustrated SGD 510 may be configured to project SGD content onto other suitable projection surface, in addition or as an alternative to, projecting such content onto the lap tray 520. For example, the position of the projector 514 may be adjustable within the housing 512 such that the projected display 524 may be projected onto a wall or any other suitable surface within the user's environment. Thus, in a particular embodiment of the present subject matter, the projector 514 may be configured to project images onto a projection panel, a projection screen and/or any other suitable object mounted to the user's wheelchair and disposed substantially in front of the user. For instance, a projection panel/screen may be disposed in a similar location relative to the wheelchair 516 and/or the user as the location at which the display device of a conventional speech generation device is typically disposed. In such an embodiment, a suitable optical input device and/or eye tracking device 528 may be utilized to capture user inputs directed towards the projection panel/screen.

Additionally, one of ordinary skill in the art should appreciate that the general SGD configuration illustrated in FIG. 5 need not be limited to wheelchair applications. In particular, such a configuration also may be utilized in other settings in which a suitable projection surface 522 is not available or when it is undesirable to project images onto any available projection surface(s). For instance, a similar configuration may be utilized in hospital settings to enable a bedridden patient to project SGD content onto a lap tray 520 resting in the patient's lap and/or onto a projection panel/screen mounted onto a portion of the patient's bed and/or supported by the floor.

Referring now to FIG. 6, yet another exemplary embodiment of a speech generation device 610 is illustrated in accordance with aspects of the present subject matter. In general, the SGD 610 may comprise some or all of the components and/or features described in reference to FIGS. 1-6. For example, the SGD 610 may include a projector 614 configured as a separate, stand-alone device which may be coupled to the central processing unit (not illustrated) disposed within the SGD housing 612 using any suitable cable 640, such as a USB cable, or via a wireless connection. Similar to the embodiments described above, the housing 612 may be configured to house the various components of the SGD 610 (e.g., one or more speakers 630, optical input device(s) and the like). Additionally, the housing 612 may define numerous openings to accommodate additional features of the SGD, such as a power button 626 and one more USB or other communication ports 628.

The separate projector 614 generally may be disposed on any suitable surface (e.g., a table 642) such that SGD content may be projected onto any available projection surface 622 (e.g., a wall, a board or the like). In general, it should be appreciated that, in the illustrated embodiments, one or more optical input device(s) may be included with the SGD 610 to permit user inputs directed towards the projected display 624 to be captured. However, in embodiments in which the projected display 624 is being projected onto a surface 622 at a distance from the user 618, it may be unpractical or impossible for the user 618 to provide user inputs by pointing to the projected image. As such, it may be particularly advantageous for user inputs to be captured utilizing eye tracking features when the projected display 624 is provided in a distal relationship to the user 618. Thus, in particular embodiments of the present subject matter, the SGD 610 may include head mounted eye tracking features 620 that enable a user's eye movements to be tracked regardless of the user's relative positioning to the projected display 624 and/or the housing 612 of the SGD 610.

Figure 7:
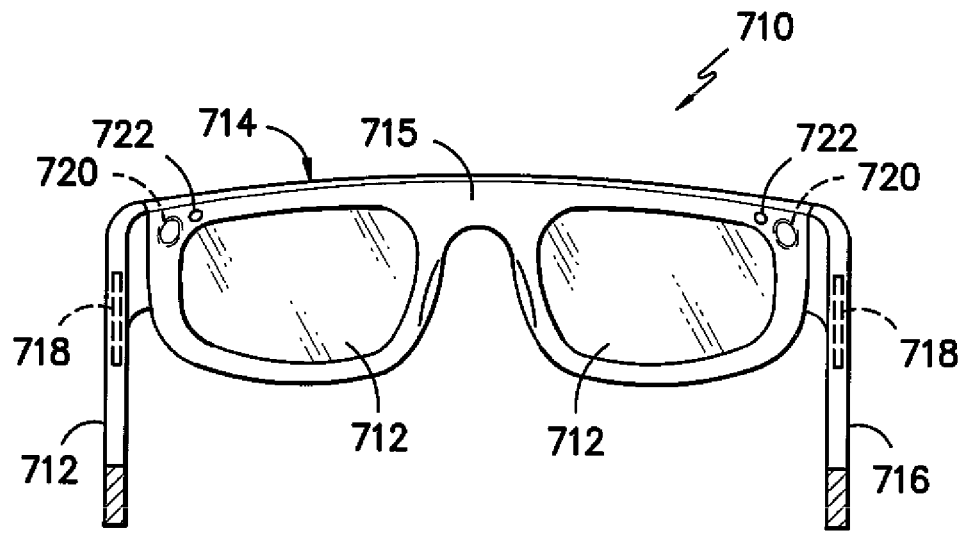
FIG. 7 illustrates an embodiment of head mounted eye tracking features that may be used with an embodiment of a speech generation device in accordance with aspects of the present subject matter.
Figure 8:
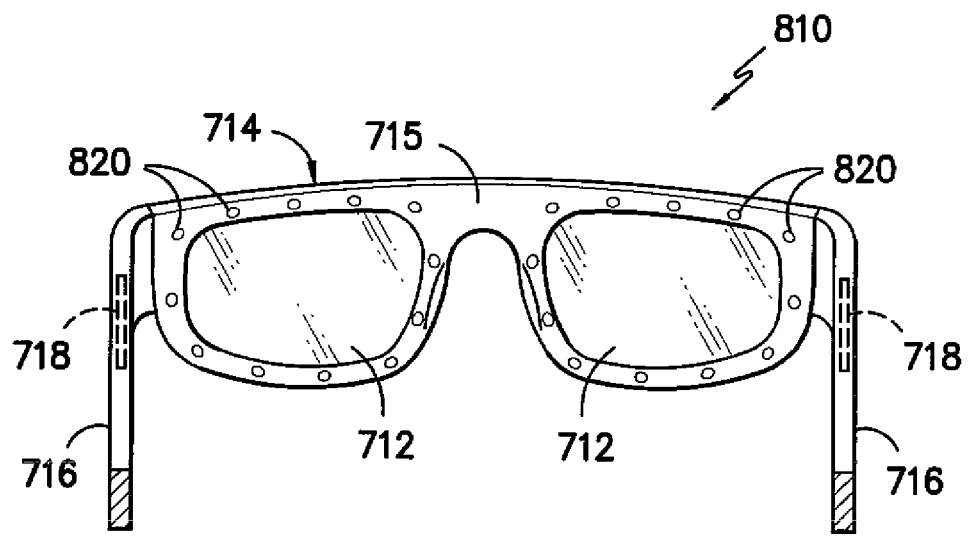
FIG. 8 illustrates another embodiment of head mounted eye tracking features that may be used with an embodiment of a speech generation device in accordance with aspects of the present subject matter.

Referring now to FIGS. 7 and 8, exemplary embodiments of head mounted eye tracking features 710, 810 are illustrated. In general, the head mounted eye tracking features 710, 810 may be embedded within or secured to any item configured to be worn, secured or otherwise disposed on a user's head. For example, the head mounted eye tracking features 710, 810 may be integrated into any suitable type of eyewear, such as a pair of eyeglasses or sunglasses or various other head-mounted items, such as a helmet or goggles. Thus, by way of example and not limitation of the present subject matter, the head mounted eye tracking features 710, 810 are generally depicted herein as being included in a pair of glasses. As particularly shown in FIGS. 7 and 8, the glasses generally may include a pair of lenses 712 secured within a frame 714 of the glasses. The frame 714 generally may include a bridge portion 715 extending between the lenses 712 and a pair of stems 716 configured to be supported on the user's ears. Of course, as is generally understood, various other features and/or components (e.g., hinges) may be included with the glasses in addition to those described and depicted herein.

Referring more particularly to FIG. 7, the head mounted eye tracking features 710 generally may include one or more optical sensors or camera(s) 720 embedded within or secured to the frame 714 of the glasses which may be configured to capture images of the user's eyes. In particular, cameras 720 may be disposed substantially adjacent to each of the lenses 712 and may be angled in the direction of one of the user's eyes to permit the movement of such eye to be tracked. Of course, it should be appreciated that the cameras 720 need not be positioned as shown in FIG. 7, but may be generally located at any position relative to the user by which images of the user's eye(s) may be captured. Additionally, one or more light sources 722, such as one or more LEDs, may be disposed within or secured to the frame 714. In general, the light source 722 may be used to generate a corneal reflection in the user's eye, thereby facilitating the determination of eye gaze direction. As such, it should be appreciated that the light source 722 may be disposed at any location on the frame 714 that allows light from the light source 722 to be directed onto the user's eye. Further, one or more microprocessors 718 may be embedded within one or both of the stems 716 to provide processing functionality to the eye tracking features 710 and may be in communication with the central processing unit of the speech generation device, via a wired or wireless connection. Alternatively, the eye tracking features 710 may be configured to directly interface with the central processing unit of the SGD and may be communicatively coupled to the processing unit via a wired or wireless connection.

Referring now to FIG. 8, another embodiment of head mounted eye tracking features 810 is illustrated. As shown, a plurality of eye sensing elements 820 may be embedded around the perimeter of each lens 712 in order to detect a user's eye movement/location. Generally, the eye sensing elements 820 may be cameras, sensors (e.g., photodiodes, photodetectors, CMOS sensors and/or CCD sensors) or any other suitable device. It should be appreciated that the eye sensing elements 820 may be used for eye gaze detection and tracking instead of or in conjunction with the camera 720 and light source 722 components previously described with reference to FIG. 7. Additionally, similar to that described above, processing functionality for the eye sensing elements 820 may be provided by one or more microprocessors 718 disposed within the frame 714 or by the central processing unit of the SGD.

One of ordinary skill in the art should appreciate that various examples of eye tracking systems and methods are known, many of which can be employed in accordance with one or more aspects of the presently disclosed technology. As such, the scope of the present subject matter need not be limited to the exact eye tracking features and/or configurations depicted in FIGS. 5-8. Examples of known eye tracker devices are disclosed in U.S. Pat. No. 3,712,716 to Cornsweet et al.; U.S. Pat. No. 4,950,069 to Hutchinson; U.S. Pat. No. 5,689,619 to Smyth; U.S. Pat. No. 5,818,954 to Tomono et al.; U.S. Pat. No. 5,861,940 to Robinson et al.; U.S. Pat. No. 6,079,829 to Bullwinkel; U.S. Pat. No. 6,152,563 to Hutchinson et al.; and U.S. Pat. No. 7,572,008 to Elvesjo et al.; each of which is hereby incorporated herein by this reference for all purposes. Examples of suitable eye tracker devices also are disclosed in U.S. Patent Application Publication Nos.: 2007/0164990 to Bjorklund et al.; and 2008/0284980 to Skogo et al.; each of which is hereby incorporated herein by this reference for all purposes.

Additionally, as indicated above, the central processing unit of the SGD may be adapted to apply various image processing algorithms to the images transmitted from the eye tracking features so as to convert such images into a cursor position projected onto the projected display by the projector. Accordingly, the user may control the cursor position through his eye movements and, thereby, make input selections on the graphical user interfaces displayed on the projected display. Optional selection methods that may be activated using the eye tracking features of the present subject matter may include blink, dwell, blink/dwell, blink/switch and external switch. Using the blink selection method, a selection may be performed when the user gazes at an object displayed on the projected display and then blinks for a specific length of time. In particular, the central processing unit may be provided with software equipped with blink detection algorithms that enable blink recognition. Additionally, the processing unit can be programmed to interpret as a "blink," a set duration of time during which an associated camera cannot see the user's eye. The dwell method of selection is implemented when the user's gaze is stopped on an object displayed on the projected display for a specified length of time. The blink/dwell selection combines the blink and dwell selection so that the object displayed on the projected display can be selected either when the user's gaze is focused on the object for a specified length of time or, if before that length of time elapses, the user blinks an eye.

In the external switch selection method, an object is selected when the user gazes on the object for a particular length of time and then closes an external switch. It should be appreciated that the external switch may generally comprise a button, flip switch or any other suitable mechanically actuated switch and may be disposed at any location accessible to the user. For example, the switch may be provided on the SGD housing, on a remote control provided to the user, or at any other suitable location in which the user has consistent and reliable motor control. The blink/switch selection combines the blink and external switch selection so that the object displayed on the projected display can be selected when the user's gaze blinks on the object and the user then closes an external switch. In each of these selection methods, the user can make direct selections instead of waiting for a scan that highlights the individual object displayed on the projected display. However, it should be appreciated that, as an alternative method, a scanning selection method may be provided in which highlighting is used in a specific pattern so that a user can blink or use a switch (or other device) to make a selection when the desired object is highlighted. Additionally, it should be appreciated that, when the central processing unit uses eye tracking features to interact with the SGD, the software can be programmed (at the user's discretion) to track both eyes or to track only one eye.

The central processing unit of the speech generation device also may be provided with suitable software instructions enabling the processing unit to properly calibrate the eye tracking features. For example, the processing unit may employ detection and tracking algorithms to accurately estimate the centers of the user's eyes, pupils and corneal-reflexes (known as glint) in two-dimensional images generated by the eye tracking features. Generally, as indicated above, interactive calibration processes are known, in which the user is prompted to look consecutively at calibration points displayed (randomly or not) on the projected display. Such calibration techniques generally may use a number of calibration points ranging, for example, from one to sixteen points. Once this calibration process is completed, a gaze measurement in the two-dimensional image provided by the eye tracking features will be mapped to its point of gaze on the projected display using an equation of this nature: $(Xs, Ys)=F(Xi, Yi)$ with F being the mapping function, $(Xs, Ys)$ the screen coordinates (or Point of Gaze) on the projected display and $(Xi, Yi)$ the gaze measurement drawn from the image provided by the camera or other image capture device.

Additional features, elements and steps that may be optionally incorporated into a speech generation device in accordance with the disclosed technology are disclosed in International Patent Application entitled "HAND-HELD SPEECH GENERATION DEVICE" corresponding to international Publication No. WO/2011/011224 (international filing date of Jul. 13, 2010), International Patent Application entitled "SEPARATELY PORTABLE DEVICE FOR IMPLEMENTING EYE GAZE CONTROL OF A SPEECH GENERATION DEVICE" corresponding to International Publication No. WO/2010/141403 (international filing date of Jun. 1, 2010) and International Patent Application entitled "SPEECH GENERATION DEVICE WITH A HEAD MOUNTED DISPLAY UNIT" corresponding to International Application No. PCT/US11/38837 (international filing date of Jun. 2, 2011), which are hereby incorporated herein by this reference in their entirety for all purposes.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A speech generation device, comprising:
   a projector configured to project images in the form of a projected display onto a projection surface disposed in front of a user;
   a lap tray mounted to a portion of a wheelchair, the lap tray configured to be rotatable relative to a user sitting in the wheelchair, and the lap tray configured to provide the projection surface, wherein at least the projection surface of the lap tray is configured as a non-transparent surface;
   an eye tracking device configured to capture images of a user's eyes as the user views the projected display, wherein the eye tracking device is attached to the projection surface at a location outside of and adjacent to a portion of the projection surface configured to receive the projected display from the projector;
   a speaker configured to generate an audio output; and
   a processing unit communicatively coupled to the projector, the eye tracking device and the speaker, the processing unit including a processor and a related computer readable medium configured to store instructions executable by the processor,
   wherein the instructions stored on the computer readable medium configure the processing unit to generate text-to-speech output,
   wherein the instructions stored on the computer readable medium further configure the processing unit to track the user's eye gaze relative to the user's point of regard on the projected display based on the images provided by the eye tracking device and configure the processing unit to provide for display, via the projector, a cursor position at a location on the projected display that corresponds to the user's point of regard on the projected display, and
   wherein the instructions stored on the computer readable medium configure the processing unit to determine the cursor position corresponding to the user's point of regard on the projected display by implementing a mapping function that maps eye gaze measurements determined from the images of the user's eyes provided by the eye tracking device to a two-dimensional coordinate space associated with the projected display and convert the images of the user's eyes into a cursor position displayed onto the projected display.

2. The speech generation device of claim 1, further comprising an optical input device configured to capture an image of a user's hand, wherein the instructions stored on the computer readable medium further configure the processing unit to recognize hand gestures performed by the user as user inputs.

3. The speech generation device of claim 1, wherein the instructions stored on the computer readable medium further configure the processing unit to capture user inputs based on the images provided by the eye tracking device.

4. The speech generation device of claim 3, wherein the user inputs are associated with at least one of dwell time or eye blinking.

5. The speech generation device of claim 1, wherein the eye tracking device comprises an image capture device and an associated light source.

6. A system for generating text-to-speech output for a user of a wheelchair, the system comprising:
- a housing attached to a portion of a wheelchair;
- a lap tray mounted to a portion of the wheelchair, the lap tray configured to be rotatable relative to a user sitting in the wheelchair;
- a projector disposed within or attached to the housing, the projector being configured to project images in the form of a projected display onto a projection surface disposed in front of the user, wherein the lap tray is configured to provide the projection surface, and wherein at least the projection surface of the lap tray is configured as a non-transparent surface;
- an eye tracking device configured to capture images of a user's eyes as the user views the projected display, wherein the eye tracking device is attached to the lap tray, and wherein the eye tracking device is disposed adjacent to the projected display on the lap tray in an area outside of the projection surface;
- a speaker configured to generate an audio output; and
- a processing unit communicatively coupled to the projector, the eye tracking device and the speaker, the processing unit including a processor and a related computer readable medium configured to store instructions executable by the processor,
- wherein the instructions stored on the computer readable medium configure the processing unit to generate text-to-speech output,
- wherein the instructions stored on the computer readable medium further configure the processing unit to track the user's eye gaze relative to the user's point of regard on the projected display based on the images provided by the eye tracking device and configure the processing unit to provide for display, via the projector, a cursor position at a location on the projected display that corresponds to the user's point of regard on the projected display, and
- wherein the instructions stored on the computer readable medium configure the processing unit to determine the cursor position corresponding to the user's point of regard on the projected display by implementing a mapping function that maps eye gaze measurements determined from the images provided by the eye tracking device to a two-dimensional coordinate space associated with the projected display.

7. The system of claim 6, wherein the housing is attached to an armrest of the wheelchair.

8. The system of claim 6, wherein the instructions stored on the computer readable medium further configure the processing unit to capture eye-based user inputs based on the images provided by the eye tracking device.

9. The system of claim 8, wherein the user inputs are associated with at least one of dwell time or eye blinking.

10. The system of claim 6, wherein the eye tracking device comprises an image capture device and an associated light source.

* * * * *